United States Patent

Nishioka et al.

[11] Patent Number: 5,770,322
[45] Date of Patent: Jun. 23, 1998

[54] CERAMIC SLIDING COMPONENT

[75] Inventors: Takao Nishioka; Masamichi Yamagiwa; Takeshi Satoh; Hisao Takeuchi; Akira Yamakawa, all of Hyogo, Japan

[73] Assignee: Sumitomo Electric Industries, Ltd., Japan

[21] Appl. No.: 633,767
[22] PCT Filed: Nov. 13, 1995
[86] PCT No.: PCT/JP95/02311
  § 371 Date: Apr. 15, 1996
  § 102(e) Date: Apr. 15, 1996
[87] PCT Pub. No.: WO96/15359
  PCT Pub. Date: May 23, 1996

[30] Foreign Application Priority Data

Nov. 14, 1994 [JP] Japan ................................. 6-279009
Nov. 14, 1994 [JP] Japan ................................. 6-279014
Nov. 14, 1994 [JP] Japan ................................. 6-279017

[51] Int. Cl.$^6$ .......................... B32B 15/04; C04B 37/02; F01L 1/14; F01L 1/18
[52] U.S. Cl. .................... 428/627; 428/469; 228/122.1
[58] Field of Search ................. 428/599, 621, 428/627, 632, 633, 687, 457, 469; 228/122.1, 124.1; 148/206, 528

[56] References Cited

U.S. PATENT DOCUMENTS 5,173,458 12/1992 Nishioka et al. ............................ 501/97
5,394,015 2/1995 Tsuzuki et al. ........................... 264/65
5,599,493 2/1997 Ito et al. .................................. 264/234

FOREIGN PATENT DOCUMENTS 59-91404   6/1984 Japan.
232692    12/1984 Japan.
62-240407 10/1987 Japan.
63-225728  9/1988 Japan.
55809      2/1990 Japan.
92749      4/1994 Japan.

OTHER PUBLICATIONS

Complete translation of Japanese publication 6–92749, Futoshi Kuroda, Apr. 1994.

Complete translation of Japanese publication 63–225728, Shigeaki Akao et al., Sep. 1988.

Primary Examiner—John J. Zimmerman
Attorney, Agent, or Firm—Bierman, Muserlian and Lucas

[57] ABSTRACT

To provide sliding components each comprising a base metal and, joined thereto, a sliding face member having a sliding face of crowning profile, in particular, sliding components such as valve train parts, a cam follower and a rocker arm of an automobile engine. A sliding component having a structure comprising (1) a ceramic forming a sliding face and (2) a base metal joined together, in which the extent of crowning of the sliding face is at least 0.1 to 0.4% of the maximum length of the junction face of the ceramic. The ceramic has a four-point flexural strength of at least 50 Kg/mm as measured in accordance with the Japanese Industrial Standard R1601. The base metal is mainly steel at least the surface of which has preferably a martensite texture and has a hardness of higher than 45 in terms of $H_{RC}$. The structure may have an intermediate layer of a metal or cermet. In one mode the junction of the sliding face member such as a ceramic of crowning profile is simultaneously carried out with the formation of the base metal part and in another mode the sliding face of the base metal is hardened by the heating after the junction. A sliding component whose extent of crowning is great can be provided at a lowered cost without suffering from defects such as cracking.

24 Claims, 9 Drawing Sheets

F I G. 10
F I G. 11
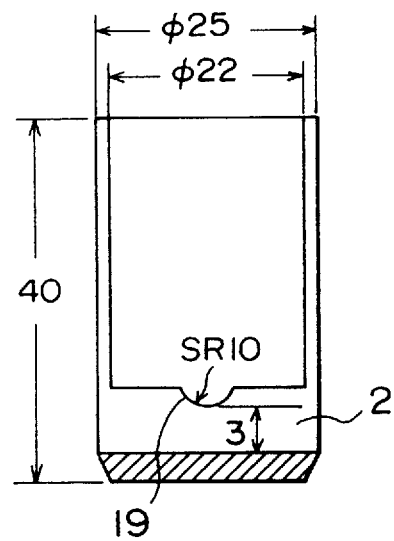
F I G. 12
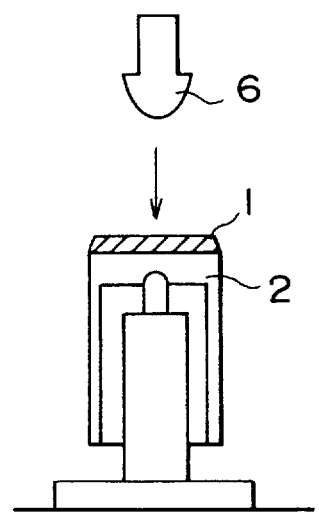

CERAMIC SLIDING COMPONENT

This application was filed under 35 U.S.C. 371 from International Application No. PCT/JP95/02311, filed Nov. 13, 1995.

TECHNICAL FIELD

The present invention relates to sliding components which are required to have wear resistance such as valve train parts, a cam follower, a rocker arm and a bearing of an automobile engine, especially those of a structure composed of a base metal and a ceramic sliding member joined together.

BACKGROUND ART

In recent years it has become of urgent necessity to strengthen the regulation on exhaust gas from automobiles from the viewpoint of global environmental issues. In particular, the reduction of the discharge of $NO_x$ (nitrogen oxides) and P/M (particulate matter) is being studied with respect to diesel engines. The reduction of $NO_x$ by attaching an exhaust gas recirculation (EGR) system to the engine exhaust system is being studied as a countermeasure. This has caused a problem such that the recirculation of exhaust gas components leads to chemical deterioration of the engine oil and introduction of P/M contaminating the oil, so that the engine sliding components would suffer from much wear.

Sliding component materials have been selected from the viewpoint of good wear resistance on the sliding face and low sliding resistance. A single material having excellent properties has been employed or a sliding member joined together has been prepared for practical utilization as a sliding component.

Attention has been drawn to ceramics having excellent sliding properties in recent years. Especially, examples of actual use are found in which a ceramic is joined to a metal material in a manner such that the ceramic is positioned in sliding parts where sliding conditions are severe.

For example, Japanese Patent Laid-Open No. 2-55809 disclosed a ceramic with excellent sliding properties being joined to a cam sliding part of an engine tappet as a countermeasure to the deterioration of lubrication conditions attributed to an increased engine horsepower and compliance with exhaust gas regulations.

Generally, mechanical sliding components each have a pair of sliding faces, one of which is not planar and has a protrudent crowning profile such that the center is slightly higher than the periphery (by about several microns to several tens of microns) in order to prevent eccentric tap.

This crowning profile is formed by, for example, machining (grinding), the process of Japanese Patent Laid-Open No. 63-289306 comprising clothing a ceramic with a metal and elastically deforming the ceramic with the clamping force of the metal, or the process of Jidosha Gijutsu (Automobile Technology), Vol. 39, No. 10, p1184 (1985) comprising previously working a tentatively sintered body into a crowning profile and conducting sintering to thereby directly use the sintered surface as a sliding face.

However, the crowning profile is three dimensional, so that the machining is costly.

In the clothing process, the extent of crowning is restricted depending on the structure, heating temperature, etc.

The process comprising previously working a tentatively sintered body into a crowning profile and conducting sintering to thereby directly use the sintered surface as a sliding face has encountered the problem that the sintering is accompanied by shrinkage which deforms the face worked into the crowning profile to thereby lower the dimensional accuracy thereof.

For example, Japanese Patent Laid-Open No. 63-225728 disclosed a process directed toward reduction of machining (grinding) cost in which a wear-resistant member having a coefficient of thermal expansion lower than that of the base metal to be joined is joined to the sliding face by heating and the sliding face is provided with the crowning profile by a difference in the coefficient of thermal expansion to thereby form the crowning without resort to machining such as grinding, so that a sliding component capable of preventing eccentric tap when subjected to sliding can be provided at a lowered cost. The above patent application specification further disclosed the use of ceramic materials such as silicon nitride, silicon carbide and sialon as the abrasion-resistant member.

Japanese Patent Laid-Open Nos. 2-199073 and 4-2672 disclosed related techniques in which not only can cracking by thermal stress be prevented but also the properties of the metal part can be maintained, for example, by studying the selections of a brazing material and a metal and the method of heat treatment (joining).

On the other hand, efficiency improvement is of urgent necessity besides the regulation on exhaust gas. The increase of the surface pressure of the sliding part is inevitable for enhancing the engine efficiency. Accordingly, it has become required that the sliding part have an extensive crowning.

Although a sliding component in which the main sliding face is formed of a ceramic having a crowning while the hardness of the metal part adapted to serve as an auxiliary sliding part is maintained can be produced by the above technique, there has been the problem that not only is it difficult to control the extent of crowning of the sliding face but also the reduction of the thermal shrinkage difference between the ceramic and the base metal by employing a brazing material capable of hardening at martensite transformation or low temperature to thereby reduce the thermal stress disenables increasing the extent of crowning thereof.

Japanese Patent Laid-Open No. 4-203206 disclosed the application of a load to the sliding face of the joined tappet to thereby cause the metal part to undergo plastic deformation and Japanese Patent Laid-Open No. 6-92749 disclosed the interposition of an intermediate layer between the ceramic and the metal to thereby regulate the extent of crowning as methods for overcoming the above problems. However, these are ineffective in removing the limitation of the extent of crowning.

The above sliding component is occasionally required to exhibit sliding properties at sliding zones other than the ceramic body or on the whole body of the component, so that hardening treatment is performed for improving the sliding properties of the metal material.

Thus, the metal part is hardened by the use of the heating and cooling effected when the ceramic is joined to the metal by heating in the previous Japanese Patent Laid-Open Nos. 2-55809, 2-199073, 42672, and 5-18213 and Japanese Patent Publication No. 5-72354.

However, the above hardening relying on heating for joining has encountered the problems that the heating temperature applied to the sliding part of the body is different from that applied at the quenching employed in the conventional hardening treatment, thereby occasionally disenabling attainment of an hardness required for the sliding performance, and that the cooling method is special, the variety of metallic material suitable therefor is limited and the working of the material (for example, SNCM 630 as specified in the Japanese Industrial Standard) is difficult, thereby causing a cost increase.

Moreover, even if the above material is used in some parts and the other parts are fabricated by the use of a easily workable cheap material in order to avoid the above cost increase, this has encountered a cost increase problem attributed to the need of additional steps for joining of two types of materials and working of the sliding parts.

The object of the present invention is to provide, for overcoming the above problems, a cheap sliding component in which not only is the metal part of the sliding component body as well rendered resistant to sliding wear but also a high-performance sliding part of extensive crowning profile especially composed of a ceramic is formed on at least one main sliding face of the sliding faces and further to provide a process for producing the sliding component and a device including the same.

DISCLOSURE OF THE INVENTION (1) The present invention provides a sliding component comprising a sliding face member joined to a base metal having a coefficient of thermal expansion greater than that of the sliding face member, the sliding face of the sliding face member having a crowning profile whose maximum height is 0.1 to 0.4% of the maximum sliding face length (referred to as "crowning proportion").

With respect to the sliding face member for use in the present invention, various types thereof can be considered depending on the actual use of the sliding component. In the present invention, the crowning profile of the sliding face member is formed by combining the sliding face member and the base metal and heating them to thereby create a difference in thermal expansion therebetween in the step of joining the sliding face member to the base metal and/or a step separate from the above step.

It is requisite that the sliding face member has a coefficient of thermal expansion lower than that of the base metal and be joined to the base metal so as to have a sliding face on which the above crowning profile of the maximum height can be formed.

Therefore, when the base metal has been decided, it is needed to select a sliding face member having a coefficient of thermal expansion which ensures formation of a crowning profile falling within the above range. Further, the sliding face member is required not to suffer from deterioration or damaging on the sliding face member per se or at the junction with the base metal when exposed to the above heating. Still further, the sliding face member must be resistant to sliding environment and load. When the temperature is relatively low and the sliding surface pressure is relatively low as practical conditions, it is preferred that the weight of the sliding face member be minimized. For example, an aluminum-based metallic material and a commercially available lightweight ceramic material can be used as the base metal and the sliding face member, respectively. In this instance, when the weight reduction is not needed, steel can be used as the base metal and, for example, a commercially available ceramic, cermet or iron-based metal having a coefficient of thermal expansion lower than that of the base metal can be used as the sliding face member.

As described above, various material combinations are conceivable depending on the use with respect to the sliding face member and base metal of the sliding component of the present invention. The sliding face of the sliding face member should have a crowning profile whose maximum height is 0.1 to 0.4% of the maximum sliding face length.

This will be explained with the use of, for example, the valve train OHV system tappet of a commercial diesel engine shown in FIG. 1 which is an example of sliding components of crowning profile as an object of the present invention. Referring to FIG. 1, the sliding face member 1 is joined to the base metal 2 via conventional junction brazing material (e.g., Ag brazing material) by heating. The sliding face is provided with a crowning profile by the difference in thermal expansion between the sliding face member 1 and the base metal 2 after the cooling. On the other hand, in the tappet component of FIG. 1, it is important especially in the application of EGR system to prevent partial wear on the sliding face 5 brought into contact with the push rod component 4 as on the sliding face on which the cam component 3 slides. For that purpose, not only is the eccentric tap of the cam component 3 on the sliding face member 1 prevented but also a crowning profile whose maximum height is 0.1 to 0.4% of the maximum sliding face length is provided to thereby cause the cam component 3 to compulsorily rotate the sliding face member 1, so that partial wear can be prevented. When the crowning proportion is less than 0.1%, the torque applied by the cam component 3 to the sliding face 1 is unsatisfactory to thereby cause partial wear of the sliding face 5. On the other hand, when the crowning proportion exceeds 0.4%, the crowning increase unfavorably deforms the sliding face member, so that a high tensile stress occurs along the circumference of the sliding face member to thereby lead to, for example, breakage of the sliding face member. The sliding component as an object of the present invention is mainly directed to rolling slide with the opposite material like the above tappet. When respect to this type of sliding member, it is desired from the viewpoint of prevention of partial wear attributed to torque transmission that the profile of the sliding face fall within the above range, irrespective of a heavy load in which a high surface pressure applies to the sliding face like the tappet or a light load.

(2) The sliding face member for use in the present invention is desired to be a ceramic. Generally, as mentioned above, various materials can be considered for use in the above sliding component of the rolling type, depending on the magnitude of the load on the sliding face.

However, it is preferred to employ a ceramic having high wear resistance and low sliding resistance as a sliding face member in the use in, particularly, valve train sliding components of an automobile engine, e.g., sliding components applied to parts where the wear resistance is required under severe load conditions such as a cam follower, a rocker arm and a bearing, especially, sliding components for a tappet having the sliding face member of crowning profile according to the present invention joined to the main sliding part of the base metal, etc. In this instance, according to the present invention, the whole body of the sliding face member joined to the base metal is a ceramic, which is provided with a crowning face of a crowning proportion falling within the above range. A preferred form is a part of the sliding face member provided with the crowning profile being a ceramic.

Examples of suitable ceramic materials include those of alumina, zirconia, silicon nitride and silicon carbide. Also, use can be made of composite ceramic materials in which fibrous components are dispersed in the above ceramic materials or in which dispersoid component is uniformly dispersed in the grain boundaries and/or inside the ceramic grains. In the present invention, the ceramic sliding face member is provided with the crowning profile by combining the sliding face member and the base metal and heating in the joining step and/or a step separate from the above step with the use of the difference in thermal expansion between the sliding face member and the base metal (with the use of the coefficient of thermal expansion of the ceramic sliding face member being smaller than that of the base metal) as mentioned above.

Therefore, it is needed to effect structural combinations in which the materials can resist the above heating temperature, no damaging is caused by crowning deformation and the junction with the base metal does not suffer from damage attributed to the stress brought about by the deformation.

Among the above types of ceramics, for example, those are preferred which have a four-point flexural strength of at least 50 kg/mm$^2$ as measured at room temperature in accordance with the Japanese Industrial Standard and exhibits a resistance against to heat shock of a temperature difference (hereinafter, referred to as "heat shock resistance to a temperature difference") of at least 400° C. Of these ceramic sliding face members, a sliding face member of silicon nitride ceramic is especially preferred which resists the thermal stress applied at the above working for providing crowning profile and which is highly resistant to sliding wear.

Silicon nitride material has been selected for forming the sliding face member, taking into account the three points:

The coefficient of thermal expansion thereof is so low that the crowning profile can stably be provided at the time of the joining; (2) the strength thereof is relatively high, so that the material can resist the tensile stress occurring upon the formation of the crowning profile; and (3) the hardness thereof is relatively high, so that the material is excellent in wear resistance. Still preferably, use is made of a silicon nitride ceramic having a four-point flexural strength of at least 100 kg/mm$^2$ as measured at room temperature in accordance with the Japanese Industrial Standard, a heat shock resistance to a temperature difference of at least 800° C., a Charpy impact value of at least 15 kJ/m$^2$ at room temperature and an area percentage of pores opening at the sliding face of 0.5% or less relative to the area of the sliding face. The use of those having a four-point flexural strength of at least 130 kg/mm$^2$ as measured in accordance with the Japanese Industrial Standard is especially preferred.

The reason for setting the area percentage of pores opening at the sliding face at 0.5% or less relative to the area of the sliding face is that otherwise P/M components (i.e., soot, SO$_3$, etc.) would mingle into the engine oil when the EGR system is provided to thereby increase the tendency to wear on the sliding face and the opposite sliding face.

The ceramic of high strength and high impact resistance is selected for use in the formation of the sliding face member because it is important to resist the thermal shock and stretching stresses during the temperature rise and fall encountered when the ceramic is joined to the base metal with the use of, for example, a brazing material of relatively high melting point or when heating is effected to provide the crowning profile falling within the range of the present invention so that itself does not suffer from damaging. Further, it is because, if an impact load is applied at the time of sliding, the sliding face member should be capable of resisting the same.

When among the above ceramics a silicon nitride ceramic is used as a sliding face member, it is preferred that not only be the crowning profile having the above sliding face maximum height provided but also the ratio of the thickness (t) of the crowning profile part (namely, the thickness (t) of the fixed sliding part) to the sliding face maximum length (l) of the crowning profile part be set at 0.01 to 0.05 (i.e., 1 to 5%).

This will be explained with respect to the tappet component as shown in FIG. 2 as an embodiment of the present invention. Referring to FIG. 2, when the ratio of the thickness (t) of the sliding face member 1 to the maximum length (l) of the joined face is less than 0.01, the sliding face member 1 is likely to suffer from fracture and other problems attributed to the impact applied by the cam component. On the other hand, when the ratio exceeds 0.05, the deformation resistance of the sliding face member 1 is high when the crowning profile is provided, for example, a large tensile stress is applied, for example, to a ceramic, so that it becomes difficult to obtain a stable crowning profile.

When especially a special silicon nitride ceramic of high strength and high impact strength whose four-point flexural strength mentioned above is at least 100 kg/mm$^2$ is used as the sliding face member according to the present invention and when, for example, the sliding part supporting structure of FIG. 2 is employed, it is preferred that the design be made so as for the ratio of the minimum thickness (f) of the base metal obtained by cutting along the center line (C—C) perpendicular to the joined face (that is, thickness of the minimum thickness part of the base metal, which minimum thickness part forms a sliding face of the base metal on which the push rod component 4 slides as shown in FIG. 1) to the thickness (t) of the sliding member to be at least 0.5 besides the above crowning profile of the above maximum height and the ratio of the thickness (t) of the sliding face member of the crowning profile part to the sliding face maximum length (l).

When the ratio is as mentioned above, the probability of deformation of the base metal 2 is reduced during the formation of the crowning profile, so that a stable crowning profile of sliding part can be obtained with enhanced reproducibility.

(3) It is preferred that the surface roughness of the sliding face be 0.4 μm or less in terms of the ten-point mean roughness measured in accordance with the Japanese Industrial Standard with respect to all of the sliding face member as an object of the present invention.

The reason is that, when the ten-point mean roughness exceeds 0.4 μm, the surface of the opposite material of the sliding member is likely to suffer from wear. Especially in the case of rolling slide under a heavy load (surface pressure) as on the tappet, it is likely to damage the cam component as the opposite material. For example, when the crowning forming sliding face of the tappet is composed of a ceramic as described above and the cam component is composed of quenched steel, unfavorably the cam component is composed of quenched steel, unfavorably the cam component would suffer from selective wear by the slide on the ceramic.

(4) The profile of the sliding face of the sliding face member as an object of the present invention is desirably controlled so that not only is the above crowning proportion range of 0.1 to 0.4% satisfied but also the curvature of the periphery of the crowning profile of the sliding face is not greater than 0.8-fold (i.e., 80%) of the curvature around the center (referred to as "curvature ratio").

The above control enables reducing the danger of tensile breakage attributed to thermal stress. Thus, the lowering of the above curvature ratio also enables the use without damaging of, for example, commercially available silicon nitride ceramics other than the above special silicon nitride ceramic whose four-point flexural strength is at least 100 kg/mm² and also ceramics which are inferior in the above strength such as those of alumina, zirconia and silicon carbide as the ceramic sliding face member.

(5) Although the base metal for use in the present invention is not limited as long as it provides a combination in which the coefficient of thermal expansion of the base metal is greater than that of the sliding face member and as long as the proportion of crowning formed on the sliding face member by heating is in the range of 0.1 to 0.4% as mentioned above, steel is preferred when the base metal is used as a member constituting the above tappet in which a heavy load applies to part of the base metal. Among a variety of steels, those having a martensite texture at the surface of the sliding face forming part and having a hardness of at least 45 in terms of $H_{RC}$ are preferred.

The above partial or entire hardening of the sliding face of the steel base metal is performed by an appropriate combination of carburization and surface hardening. The hardness of the base metal is adjusted to the above level because when the base metal is used, for example, as a sliding member as shown in FIG. 2 like the tappet and cam at an $H_{RC}$ of less than 45, the push rod part of FIG. 2 constantly slides under a high surface pressure, so that the wear thereof is large to thereby impair the rotational accuracy of the rotary drive at rolling slide to be likely to have the deformation of the tappet base metal per se or partial wear.

Generally, however, the hardening of the base metal is satisfactory if it is locally conducted at only the part to which a sliding load applies.

When the sliding face member is joined by brazing and thereafter surface hardening is conducted with respect to, for example, the tappet of FIG. 2, rapid cooling with oil or air is needed. It is necessary to select a sliding face member which has a thermal shock resistance withstanding the rapid cooling after joining by brazing at higher temperatures so as to avoid loose brazing part and which resists deformation and prevents damaging around the junction. When a ceramic is employed, it is necessary to select a suitable one having the above heat shock resistance to temperature difference and flexural strength, depending on the difference between the brazing temperature and the surface hardening temperature of the base metal.

That is, it is needed to decide whether a ceramic having a heat shock resistance to a temperature difference of at least 400° C. and a flexural strength of at least 50 kg/mm² is satisfactory or a special silicon nitride ceramic having a thermal shock resistance to a temperature difference of at least 800° C. and a flexural strength of at least 100 kg/mm² is needed on a case-by-case basis, taking into account the combination and practical conditions.

In the present invention, alternatively, a steel base metal having its entirety carburized in advance is provided, a sliding face member is joined thereto by heating and surface hardening is conducted only in the part of the main body where sliding property is required. That is, in this instance, when the base metal undergoes customary carburization, joining by heating and quenching, the surface of the main body per se is hardened, so that the sliding property thereof is improved over that of nontreated material. Further, the internal texture thereof retains toughness, so that the resultant member has satisfactory strength for resisting impact load as a sliding component.

The above hardening provides a hardened steel base metal, so that the sliding component of the present invention having one or more sliding faces, at least one of which is joined to the main body by heating, can be obtained. That is, while, for example, the main sliding face is composed of a ceramic and fixed as a sliding face member, another sliding part can simultaneously be formed which is composed of a metal hardened to an $H_{RC}$ of at least 45.

Further, a sliding face member of a composite structure suited for the practical sliding conditions of the sliding face can be produced by selecting the material to be hardened and hardening conditions.

Illustratively, in the present invention, any arbitrary sliding face can be formed on a part of the sliding component with the utilization of the softening of the steel part attributed to the heat buildup at the time of surface hardening and the volume expansion attributed to martensite transformation. The location of surface hardening is appropriately selected depending on the site of the sliding face where the crowning is provided. The extent of provided crowning can be controlled in a wide range, depending on the method and procedure of surface hardening (for example, heating and cooling time) and the type of employed steel material.

Although the type of the main body steel material is not particularly limited as long as the $H_{RC}$ thereof is adjusted to at least 45 by carburization and quenching, it is preferred from the viewpoint of strength and material and working costs to employ carbon steel widely used as a steel for machine structural use or an alloy steel in which Ni, Cr and/or Mo are mixed as alloy elements. That is, for example, any of the following steels is used as the sliding member of the present invention:

(1) steel containing at least 0.1 wt. % of C, 0.1 to 0.5 wt. % of Si, 0.2 to 1.2 wt. % of Mn, 0.1 to 2 wt. % of Cr, up to 0.03 wt. % of each of P and S, up to 0.3 wt. % of Cu as an impurity and up to 0.25 wt. % of Ni and inevitable elements;

(2) steel containing at least 0.1 wt. % of C, 0.1 to 0.5 wt. % of Si, 0.2 to 1.2 wt. % of Mn, 0.1 to 2 wt. % of Cr, 1 to 5 wt. % of Ni, up to 0.03 wt. % of each of P and S and up to 0.3 wt. % of Cu as an impurity and inevitable elements; and (3) steel containing at least 0.1 wt. % of C, 0.1 to 0.5 wt. % of Si, 0.2 to 1.2 wt. % of Mn, 0.1 to 2 wt. % of Cr, 0.1 to 1 wt. % of Mo, up to 0.03 wt. % of each of P and S, up to 0.3 wt. % of Cu as an impurity and up to 0.25 wt. % of Ni and inevitable elements.

The hardenability and abrasion resistance of the main body steel material are increased in the sliding component of the present invention. However, the content of expensive additive element Cr is as low as 0.1 to 2% by weight and also, with respect to expensive Ni and Mo, neither is added or only one of them is added, so that the cost of the sliding component can be reduced. The content of Cr is preferred to range from 0.2 to 1.5% by weight.

The addition of Ni can increase the toughness without detriment to the strength of the steel. For rendering this function effective, it is preferred that Ni be added in an amount of at least 1% by weight. However, Ni is expensive, so that the addition of a large amount of Ni is not preferable from the viewpoint of cost. Up to 5% by weight is preferred and 1 to 3% by weight is still preferred. The addition of Ni brings about a synergistic effect with Cr to thereby strikingly improve the hardenability.

The addition of Mo improves not only the hardenability but also the workability at high temperatures. Taking cost into account, the amount of added Mo is preferred to range from 0.1 to 1% by weight and still preferred to range from 0.1 to 0.3% by weight. It is desired that the amount of each element added be regulated depending on the use of the sliding component.

(6) When the ceramic sliding face member is fixed by using only a brazing material layer in the present invention, it is preferred that the brazing material layer have a thickness ranging from 15 to 25 μm. When the thickness of the brazing material layer is smaller than 15 μm, the thermal stress cushioning effect by the brazing material layer at the time of the joining is occasionally reduced. On the other hand, when the thickness exceeds 25 μm, the brazing material layer may suffer from strength lowering. In this instance, it is advantageous to interpose an intermediate layer which is different from the base metal and sliding member between the base metal and the sliding face member for enabling the ceramic to resist the thermal stress occurring at the time of the joining.

This intermediate layer may substitute for the brazing material layer, depending on the situation. When brazing is conducted with the use of the intermediate layer, the above range of brazing material layer thickness is irrelevant. In this instance, satisfactory resistance to the hardening treatment after the joining must be ensured.

For example, an Al alloy may be used. However, this is not favorable because the temperature at which the surface hardening of steel is conducted is higher than the melting point thereof. Rather, for example, Cu having a higher melting point is preferred. The intermediate layer should be selected taking into consideration the affinity for the ceramic at the time of the joining. Generally, the surface is provided with a pretreatment or aftertreatment, for example, vapor deposition of an active metal such as Ti or Zr. According to necessity, the stress relaxation is effected by disposing an intermediate junction layer of a thin multilayer structure.

Generally, however, it is preferred to combine the brazing material layer with the intermediate layer of a component different from the brazing material, thereby forming a junction inclusion layer.

The intermediate layer is additionally arranged because, while relaxing the thermal stress imposed on the ceramic by the intermediate layer, the inclusion of the layer brings about the merit that a large extent of crowning which cannot be attained by the junction inclusion layer solely composed of the brazing material layer can be obtained at the time of the heat joining, depending on the structure of the intermediate layer. Moreover, as mentioned above, it not only exerts cushioning function when surface hardening of the sliding part is conducted after the heat joining but also contributes to stress cushioning at practical use.

The intermediate layer is preferably composed of a cermet or metal whose Young's modulus is greater than that of the ceramic for increasing the extent of crowning, and the Young's modulus is still preferably not lower than $4.5 \times 10^5$ MPa. Further, for achieving both the crowning increase and the thermal stress relaxation, it is preferred that the coefficient of thermal expansion of the periphery of the intermediate layer be closer to the coefficient of thermal expansion of the ceramic than that of the center thereof. Still further, it is preferred that the Young's modulus and yield stress of the periphery of the intermediate layer be lower than those of the center thereof.

From the viewpoint of thermal stress relaxation it is preferred that the intermediate layer have a coefficient of thermal expansion or capability of plastic deformation intermediate between those of the base metal and the ceramic and that the Young's modulus of the intermediate layer be lower than that of the base metal.

The ceramic is joined to the base metal by brazing, and the melting point thereof is preferred to be at least 700° C., preferably, at least 850° C. When the brazing is conducted at 850° C. or higher, it is preferred that the brazing material be one not containing copper, for example, one composed of Ag-Ti system.

The following two conditions should be satisfied for increasing the extent of crowning of the ceramic forming the sliding face by operation at the joining and thermal stress at the cooling without resort to the machining after the joining.

The first condition is the presence of a stress capable of forming a crowning. The stress would be produced by the application thereof effected at the joining or by the thermal stress created after the joining. When the thermal stress method is selected, it is required that the coefficient of thermal expansion of a part such as the ceramic to be joined to the base metal or a thermal stress relaxation layer be low to thereby ensure a difference of at least a certain value from that of the base metal, that the rigidity of the above part be high, namely, have a thickness of at least a certain value, and that the Young's modulus thereof be high.

The second condition is the formation of a structure capable of withstanding the stress produced by the formation of the crowning. When the ceramic is joined to the base metal, the ceramic part may be cracked by the tensile stress produced at the ceramic part mainly by the thermal shrinkage occurring at the cooling. This tensile stress is attributed to the deformation of the ceramic part, so that it poses a grave problem when the crowning must be increased. The present invention provides a sliding component having an extensive crowning formed at the ceramic part without the occurrence of crack and other defects. When the ceramic is joined to the base metal, generally, the coefficient of thermal expansion of the ceramic is lower than that of the base metal, so that, fundamentally, compressive and tensile thermal stresses occur on the ceramic side and the base metal side, respectively, in the vicinity of the junction face. The ceramic material is highly resistant to compressive stress, so that cracking is scarcely caused by the compressive force. On the other hand, as shown in FIG. 3, the joined body has a crowning formed by deformations of the ceramic 1 and base metal 2 effected by the difference in coefficient of thermal expansion therebetween. However, a tensile stress perpendicular to the junction face is produced by the deformations at the periphery of the joined body (FIG. 4). The reason for occasional occurrence of cracks as denoted by numeral 17 in FIG. 4 in the joined body would be that the above tensile strength is greater than the strength of the material. Although the magnitude of the above tensile stress is determined by numerous factors, it fundamentally depends on the degree of the above deformations. Thus, it has been difficult to prepare a joined body of extensive crowning.

The simplest and effective method of preventing the rupture of the ceramic while maintaining the extensive crowning comprises selecting a highly strong ceramic material whose coefficient of thermal expansion has a large difference from that of the base metal. A ceramic meeting this requirement is the above silicon nitride. The coefficient of thermal expansion of silicon nitride is $3 \times 10^{-6} K^{-1}$ and has a significant difference from that of any of most base metals and the strength thereof is also high, so that it is the most suitable material. As mentioned above, among silicon nitride varieties, those having a strength of at least 100 kg/mm² and, especially, at least 130 kg/mm² are preferred. It is known that the ceramic strength has different values depending on the measuring method. Herein, a four-point flexural strength is employed which is measured in accordance with the Japanese Industrial Standard R1601. Among silicon nitride varieties which generally have high strength, the use of those having a strength of at least 130 kg/mm² strikingly reduces cracking even under severe joining conditions or during heating for quenching. This trend is manifest when the base metal is steel. The reason is presumed to be that the stress relaxation attributed to plastic deformation of the base metal side would be dominant at the joining with the ceramic of high strength.

With respect to the use of steel as the base metal, Japanese Patent Laid-Open Nos. 2-55809 and 2-199073 describe the selection of steel varieties and joining conditions (especially, cooling conditions) and the use of low-melting-point brazing material for attaining the above maintenance of steel hardness or for preventing ceramic cracking by reducing the substantial difference in coefficient of thermal expansion with the utilization of the martensite transformation and with the use of steel as mentioned above. These methods are effective in preparing a crackless sliding component while maintaining its high hardness but have been unable to increase the extent of crowning because of small thermal shrinkage difference. Forming the junction at high temperatures, for example, by the use of a high-melting-point brazing material is effective in obtaining an joined body of extensive crowning while maintaining the hardness of the steel material. Although the relationship between the junction forming temperature and the extent of crowning/thermal stress depends on the ceramic/base metal and intermediate layer described below, so that indiscriminate description is improper, the junction forming temperature is preferred to be 700° C. or higher and especially 850° C. or higher. When the temperature is lower than 700° C., it is not easy to obtain a satisfactory crowning extent. Even if the expansion accompanying the martensite transformation is taken into consideration, a satisfactorily extensive crowning can easily be obtained at especially 850° C. or higher. A suitable brazing material having a melting point of 850° C. or higher is one composed of Ag and Ti. When $Si_3N_4$ is selected as the ceramic, the brazing at high temperatures with the use of a brazing material containing Cu (for example, brazing material composed of Au, Cu and Ti having a melting point of 910° C.) is not suitable because it lowers the interfacial strength.

When use is made of a sintered silicon nitride of ordinary strength or other ceramic materials, the joined body cannot stand produced thermal stress, so that cracking cannot be avoided. However, when use is made of the above sintered silicon nitride having a strength of at least 130 kg/mm², a crackless joined body is usually obtained even if a direct joining to the steel material is effected. The employment of a silicon nitride of high strength not only enables avoiding failure attributed to thermal stress as mentioned above but also, naturally, leads to lowering of the probability of cracking attributed to heavy load and impact at the practical use as a component.

When a ceramic material other than silicon nitride must be used because of the superiority in performance except strength and thus the employed material has a relatively low strength or when, even if a silicon nitride of high strength is employed, ceramic cracking cannot be avoided because of configurational factors (for example, the junction face is very broad), it is advantageous to interpose the intermediate layer 6 between the ceramic 1 and the base metal 2 as shown in FIG. 5.

It is known that a material having a coefficient of thermal expansion intermediate between those of materials to be joined or close to that of the ceramic or a material having a capability of plastic deformation is suitable for forming an intermediate layer intended for thermal stress relaxation. The former material is preferred for use in the formation of an extensive crowning as in the sliding component of the present invention. The latter material is not suitable because it rather reduces the extent of crowning. The reason for the preference for the former material is that, when the intermediate layer has a low coefficient of thermal expansion, it also contributes to the formation of crowning, thereby enabling the crowning to be greater than in direct joining of the ceramic. With respect to other properties to be possessed by the intermediate layer, a high Young's modulus can be mentioned. An advantage of the high Young's modulus resides in that a high stress is produced by a slight deformation, so that a high effect of increasing the crowning is ensured. It can be mentioned as another advantage that the intermediate layer has a structure suitable for backing up the ceramic, so that the intermediate layer's having a high Young's modulus is highly effective in suppressing the deformation of the ceramic when a high stress or impact strength has applied to the ceramic. From this viewpoint, it is preferred that the Young's modulus of the intermediate layer be higher than that of the corresponding ceramic. Examples of the above materials of high Young's modulus and low coefficient of thermal expansion include metals such as Mo, W and alloys thereof and cermets such as WC, TiC and TiN-based materials. In particular, what is known as cemented carbide, which contains WC as a principal component and Co as a major bonding phase, has a coefficient of thermal expansion ranging from $4.5 \times 10^{-6} K^{-1}$ to $5.5 \times 10^{-6} K^{-1}$ and a Young's modulus of $4.5 \times 10^5$ MPa or higher. Thus, this material is the most suitable for the objective of the present invention. When the Young's modulus is $4.5 \times 10^5$ MPa or higher, the effect of the intermediate layer on the crowning formation and the backup function is especially striking.

Although generally the intermediate layer is composed of a material having a coefficient of thermal expansion intermediate between those of materials to be joined, a material of lower thermal expansion coefficient may be used depending on the type of the ceramic. For example, when $Al_2O_3$ is used as the ceramic, use can be made of an intermediate layer having a coefficient of thermal expansion slightly lower than that of $Al_2O_3$ such as Mo or W-Cu alloy. This intermediate layer is also effective in thermal stress relaxation and crowning increase.

Control of the crowning profile can be mentioned as a further effective method for not only securing an appropriate extent of crowning but also attaining a thermal stress relaxation. That is, rendering the curvature of the periphery (part A) of the joined body smaller than that of the center (part B) thereof as shown in FIG. 6 enables preventing the ceramic 1 part from cracking while securing a substantial extent of crowning. The tensile stress at the periphery which is the cause of ceramic cracking is mostly produced by the deformation made in the vicinity of the periphery, so that reducing the curvature at this part only prevents a large tensile stress from occurring at the ceramic part. Thus, a crackless joined body can be fabricated. The deformation (curving) of the center causes mainly a compressive stress to occur at the ceramic part, so that the deformation is not likely to lead to cracking. For example, as mentioned above, when the curvature of the periphery exceeds 0.8-fold of that of the center, the effect of lowering the stress is slight. The boundary between the periphery and the center varies depending on the materials and configurations of constituent parts, so that it lacks definiteness. However, it should be construed that the periphery means a region ranging from the outermost edge to a distance equal to about 1 to 2 times the thickness of the ceramic part and that the center means a region ranging from the center of the ceramic part to about 30-50% of the size thereof.

The above control of the crowning profile is achieved by the following method in which use is made of an intermediate layer having properties different between the periphery and the center or method in which a stress is applied at the time of joining (forced deformation).

In the intermediate layer method, a material is employed which realizes properties different between the periphery 6 and the center 7 of the intermediate layer as schematically shown in FIG. 7. The center and the periphery may be integrated together or not, and each thereof may be composed of a plurality of materials. The properties may continuously change along the intermediate layer. The above control of the crowning profile can be effected by rendering the coefficient of thermal expansion of the intermediate layer at the periphery closer to that of the ceramic than at the center. Similar effect can be exerted by lowering the Young's modulus or yield stress of the periphery of the intermediate layer besides the coefficient of thermal expansion. These properties may be changed simultaneously.

In the intermediate layer of the above structure, the extent of crowing is mainly governed by the inner side of the intermediate layer, so that the outer side thereof may be composed of a material having low Young's modulus and yield stress.

Even if the intermediate layer 21 is provided only at the periphery with the ceramic 1 and the base metal 2 being directly joined together at the center as shown in FIG. 8, similar effect is exerted. In this structure, the intermediate layer 21 may be composed of a ring-shaped single material, so that cost reduction can be attained. In this structure as well, naturally, the intermediate layer may be composed of a plurality of materials. With respect to the properties, the intermediate layer should satisfy at least one of the requirements for lower coefficient of thermal expansion than that of the metal, capability of plastic deformation and low Young's modulus.

The other method of controlling the crowning profile comprises conducting the joining while applying a stress. The above joined body having a curvature which is smaller at the periphery than at the center is obtained, for example, by conducting heat joining while pressing the ceramic 1 and the base metal 2 against the mold 8 having a smaller curvature at the periphery with the pestle 9 as shown in FIG. 9. With respect to the shape of the mold, a protrudent one as shown in FIG. 10 may also be advantageously used. The formation (sintering and forging) of the metal part can be conducted simultaneously with the joining.

The process for producing the sliding member of the present invention will now be described.

(1) The process of the present invention comprises a step (I) of providing the base metal and the sliding face member for forming the sliding face, a step (II) of working both the base metal and the sliding face member so as to form mating faces adapted to form a junction face in order to fix the sliding face member on at least one part of the base metal and a step (III) of disposing the two mating faces opposite to each other and heating to thereby fix the sliding face member on the base metal. The fixing (joining) can be accomplished by the conventional method such as brazing or diffusion joining.

In the heating for fixing the sliding face member according to the step (III) of the present invention, a method is employed in which the two opposite mating faces are directly contacted each other, or a method is employed in which a brazing material and/or an intermediate layer material other than the brazing material is interposed between the mating faces.

Depending on the use, the above heat fixing method in which the two mating faces are directly contacted each other includes a heat fitting technique taking advantage of a thermal expansion difference therebetween.

Both the method in which the two opposite mating faces are directly contacted each other and the method in which a brazing material and/or an intermediate layer material other than the brazing material is interposed between the mating faces include a technique in which heating is effected by means of a recessed mold having a three-dimensional crowning curved surface followed by application of a pressure in the mold as an auxiliary pressure molding means.

The latter pressure application in the mold may be performed as a separate crowning extent regulating means after the heat fixing of the sliding face member on the main body.

For example, when a structure is employed in which the sliding face member is fixed on the base metal, the ceramic is disposed on a main sliding part which is a part of the sliding face member. That is, when a sliding part structure is employed in which the ceramic is held on the metal, a method may be employed in which the sliding part is fabricated in advance through the same step as the step (III) and heat fixed on the main body. This fixing on the main body may be conducted by other methods such as mechanical screwing, depending on the use. Further, for example, the ceramic is directly embedded in the main body by a combination of the above methods to thereby enable forming the sliding face on the surface of the main body around the ceramic.

Occasionally, the crowning profile is provided only the ceramic part excluding the main body from the main sliding face.

With respect to the atmosphere, temperature and heating method of the heat fixing step (III), appropriate conditions are selected depending on the material of the main body at the sliding part, the combination of the sliding part material and the brazing and intermediate layer materials, if temporarily employed as an inclusion layer, and the desired extent of crowning for the crowning profile.

With respect to the atmosphere, the heating is generally conducted in vacuum or an inert gas (for example, Ar, $H_2$ or $N_2$) under a given pressure. The pressure may be lower or higher than the atmospheric pressure. The heating is conducted by any of the following various methods.

When the member to be joined is the ceramic, the joining is conducted by brazing. When the ceramic is directly joined to the metal, a silver-based brazing material containing Ti such as an Ag-Cu-Ti or Ag-Ti brazing material is selected. When the junction face side of the ceramic has been metallized, an Ag-Cu brazing material or the like is preferred.

It is preferred that the brazing be conducted in a nonoxidizing atmosphere (vacuum or Ar, $N_2$, $H_2$ or a mixture thereof). The fitting may be conducted according to the conventional method such as press fitting or shrinkage fitting.

In the step (III) of the present invention, a crowned sliding face of the above crowning proportion can be formed simultaneously with the fixing and joining of the sliding face member to the base metal. An intermediate layer may be provided in the junction layer.

(2) In the process of the present invention, a step(IV) of hardening the sliding part of the base metal may be incorporated after the step (III). The means of this step include a technique in which only the profile part of the sliding part is surface hardened and a technique in which molding under pressure in a recessed crowning mold is conducted simultaneously with the above hardening. Further, a technique in which these are combined in sequence is included. The above steel having an $H_{RC}$ of about 45 or higher after the hardening is employed as the base metal to be surface hardened. The surface hardening is conducted by the conventional hardening method in which high frequency, flame, laser beam or electron beam is employed.

When the toughness must be secured at the part where hardening is performed, use may be made of the above previously carburized steel body. This carburization may be effected by any of the conventional solid, liquid and gas carburization techniques. The hardening temperature and cooling method are not particularly specified as long as the hardness of the hardened sliding component body is at least 45 in terms of $H_{RC}$. It is satisfactory to follow the procedure specified in the Japanese Industrial Standard regarding the employed steel (for example, Japanese Industrial Standard G4103 regarding nickel/chromium/molybdenum steel which is an alloy steel for machine structural use).

The hardened sliding component body may be tempered in order to enhance the toughness thereof. The procedure as specified in the Japanese Industrial Standard may be selected as long as the hardness of the sliding component body can be held at 45 or higher in terms of $H_{RC}$.

In this instance, the heat joining is preferably conducted at a temperature not lower than the quenching temperature in order to prevent the deterioration of the junction part.

When the member intended for sliding face formation is secured to the sliding component body, this is conducted by joining or fitting. The joining may be conducted by any of the conventional methods including heat joining such as brazing or diffusion joining, welding and pressure bonding.

Thus, it is most especially preferred that the heat joining temperature of the above step (III) be 800° C. or higher from the viewpoint of avoiding the effect of the temperature rise during the hardening For example, when use is made of hypoeutectoid steel, the appropriate heating temperature during the surface hardening is believed to be 30° to 50° C. above the $A_{C3}$ or $A_{C1}$ transformation point at which only the austenite phase is present, so that the joining temperature is preferred to exceed 800° C.

DESCRIPTION OF THE DRAWING

FIG. 10 is an explanatory view of a mold configuration.

FIG. 11 :s an explanatory view of a form of tappet described in Example 1.

FIG. 12 is a view explaining the Charpy drop impact test.

DEFINITION OF MARK

Figure 1:
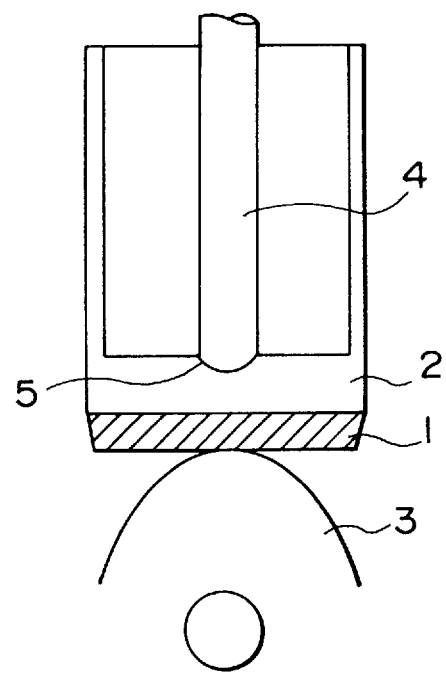
FIG. 1 is an explanatory view of a valve gear OHV system tappet of a commercial diesel engine to which the present invention has been applied.
Figure 2:
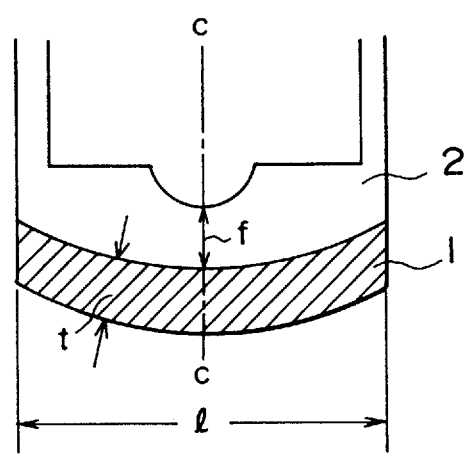
FIG. 2 is an explanatory view of a tappet component to which the present invention has been applied.
Figure 3:
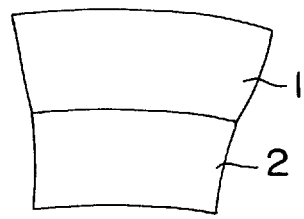
FIG. 3 is a view explaining a crowning formation effected by a difference in coefficient of thermal expansion between a ceramic and a base metal.
Figure 4:
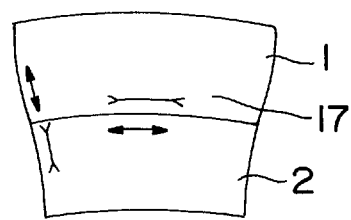
FIG. 4 is a view explaining a stress and crack produced by the above difference.
Figure 5:
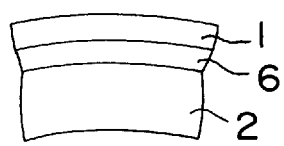
FIG. 5 is a view explaining a mode of use of an intermediate layer according to the present invention.
Figure 6:
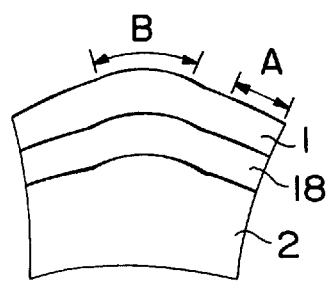
FIG. 6 is a view explaining control of the crowning profile according to the present invention.
Figure 7:
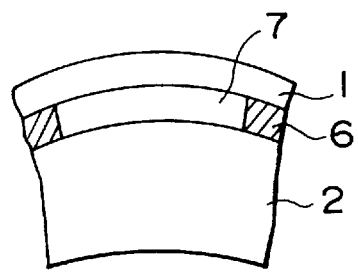
FIG. 7 is a view explaining a mode of use of a material providing the intermediate layer with properties different between the center and the periphery thereof.
Figure 8:
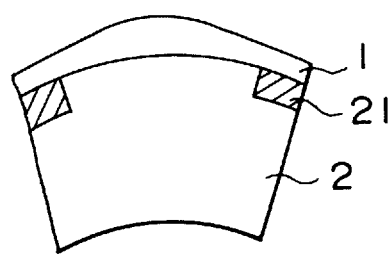
FIG. 8 is a view explaining a mode of use of the intermediate layer only at the periphery.
Figure 9:
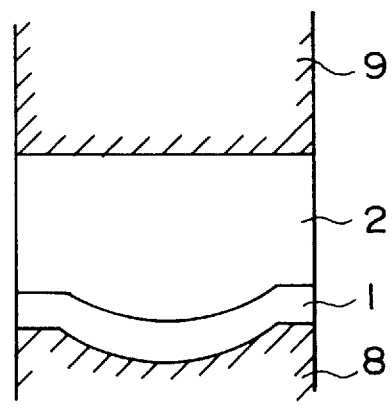
FIG. 9 is a view explaining a method of regulating the crowning profile.

1: sliding face member (ceramic is an example),
2: base metal,
3: cam,
4: push rod,
5: sliding face of base metal,
6: intermediate layer at periphery,
7: intermediate layer at center,
8: mold,
9: pestle,
10: tappet body (base metal),
11: brazing material (silver brazing material is an example),
12: intermediate layer,
13: intermediate layer at periphery,
14: intermediate layer at center,
15: intermediate layer,
16: mold,
17: crack,
18: intermediate layer,
19: sliding face on which push rod slides,
20: impact material,
21: intermediate layer at periphery,
22: location of hardening, and
23: push rod.

Best Mode for Carrying Out the Invention

Example 1

Commercially available powdery $Si_3N_4$, $Al_2O_3$ and $Y_2O_3$ were mixed in respective proportions of 93% by weight, 2% by weight and 5% by weight, wet mixed in ethanol for 72 hr and dried to thereby obtain powder. The powder was CIP molded under a pressure of 1.5 t/cm², sintered at 1700° C. for 4 hr under 2 atm of nitrogen gas and HIP treated at 1650°

C. for 1 hr under 1000 atm of nitrogen gas. A specimen of 25 mm in diameter and 0.5 to 3 mm in thickness was cut from the resultant sintered body. One surface thereof was finish ground by means of a diamond wheel having an average abrasive grain size of 7 to 11 μm so that the surface roughness was 0.3 μm or less in terms of ten-point mean roughness. The thus obtained sliding face member 1 was joined to a base metal 2 made of SCr 420 having a shape shown in FIG. 11 with the use of a brazing material composed mainly of Ag in vacuum for 1 hr at a temperature varied between 780 and 900° C. Thereafter, SCr 420 was subjected to quenching according to the Japanese Industrial Standard to obtain a tappet component. The brazing layer had a thickness of 17 μm. The hardness of the sliding face 5 on which a push rod would slide of the obtained tappet component was measured. The $H_{RC}$ was 50. This component was assembled into a commercially available OHV system diesel engine for commercial car and a durability test was performed at an engine speed of 1000 rpm for 200 hr with the use of engine oil recovered after execution of 40,000 km local traveling. The mass of wear was measured on the tip of the push rod and on the receiving surface on the side of the base metal. The results are given in Table 1. In Table 1, 25 mm, i.e., the diameter of the junction face was employed as the maximum junction length determining the ratio of maximum crowning height (crowning proportion). With respect to the evaluation of the wear, the description "wear" means that the sum of the mass of wear on the tip of the push rod and on the receiving surface on the side of the base metal is 10 μm or greater and the description "no wear" means that the sum is less than 10 μm. Table 2 specifies the properties of the sintered body of $Si_3N_4$ employed in this Example. The flexural strength was measured in accordance with the Japanese Industrial Standard R1601. With respect to the Charpy impact value, the measurement was made with the use of a specimen according to the Japanese Industrial Standard R1601 under the conditions that the span was 30 mm and no notch was provided. Further, with respect to the temperature difference of heat shock resistance, the evaluation was made with the use of a specimen according to the Japanese Industrial Standard R1601 in accordance with the submergence method.

TABLE 1

| No. | Crowning proportion | Wear |
| --- | --- | --- |
| *1 | 0.01% | wear |
| *2 | 0.05 | wear |
| 3 | 0.1 | no wear |
| 4 | 0.2 | no wear |
| 5 | 0.4 | no wear |
| *6 | 0.6 | **cracked |
| *7 | 1.0 | **cracked |

*Comparative Example
**cracked: The ceramic periphery suffered from cracking.

TABLE 2

| JIS 4-point flexural strength | 105 kg/mm² |
| --- | --- |
| Charpy impact value | 15.3 kJ/m² |
| Heat shock resistance | 850° C. |

The above demonstrated that when the crowning proportion is between 0.1 and 0.4, excellent sliding performance can be attained without abrasion.

Example 2

In the same manner as in Example 1, the powdery raw materials were mixed, CIP molded and sintered in various atmospheres at 1600° to 1800° C. for 1 to 6 hr at 2 atm of nitrogen gas. Part of the sintered body was provided with the same HIP treatment as in Example 1 and a specimen was prepared. The resultant specimen was joined to the SNCM 616 metal of the same shape as in Example 1 under the same conditions as in Example 1 and subjected to the quenching treatment for SNCM 616 according to the Japanese Industrial Standard, thereby providing a tappet component. The thickness of the brazing layer was 17 μm. The properties of the obtained sintered body of $Si_3N_4$ and the sliding properties of the tappet component having the ceramic as a sliding face member were evaluated in the same manner and under the same criteria as in Example 1. The results are given in Table 3.

On the other hand, a fracture evaluation of the obtained component was conducted by Charpy drop impact test equivalent to that of Example 1 as shown in FIG. 12 to thereby observe any fracture of the $Si_3N_4$ part. Charpy impact test was conducted under the conditions such that the collision rate was 3.5 m/sec and the impact energy was 30 J. The impact material 20 was caused assuming a cam nose to have a nose shape of R=3 to 4 mm and 20 mm in width corresponding to the form of a cam nose. With respect to the occurrence of fracture of the $Si_3N_4$ part, an impact load of 80 kN was applied thereto, and the occurrence of fracture is specified as "fractured" and the nonoccurrence of fracture as "no fracture" in Table 3.

TABLE 3

| No. | Crowning proportion | Wear of cam nose in sliding test | JIS 4-pt. flexural strength | Charpy impact value | Heat shock resistance | Fracture in impact test |
| --- | --- | --- | --- | --- | --- | --- |
| *1 | 0.008% | wear | 85 kg/mm² | 5.2 kJ/m² | 650° C. | fractured |
| 2 | 0.10 | no wear | 92 | 8.5 | 750 | fractured |
| 3 | 0.20 | no wear | 128 | 14.2 | 850 | no fracture |
| 4 | 0.10 | no wear | 128 | 14.2 | 850 | no fracture |
| *5 | 0.008 | wear | 140 | 18.9 | 850 | no fracture |

TABLE 3-continued

| No. | Crowning proportion | Wear of cam nose in sliding test | JIS 4-pt. flexural strength | Charpy impact value | Heat shock resistance | Fracture in impact test |
|---|---|---|---|---|---|---|
| 6 | 0.25 | no wear | 140 | 18.9 | 850 | no fracture |
| 7 | 0.35 | no wear | 140 | 18.9 | 850 | no fracture |
| 8 | 0.35 | no wear | 92 | 8.5 | 750 | **cracked |
| *9 | 1.20 | wear | 140 | 18.9 | 850 | **cracked |

*Comparative Example
**cracked: The ceramic periphery suffered from cracking.

The above results demonstrated that a tappet component highly reliable in resistance to high impact fracture especially at sliding can be obtained by the use in the formation of the sliding face thereof of a ceramic of 0.1 to 0.4% in crowning proportion composed of a sintered body of $Si_3N_4$ having a four-point flexural strength of at least 100 kg/mm$^2$ measured in accordance with the Japanese Industrial Standard, a Charpy impact value of at least 15 kJ/m$^2$ and a heat shock resistance to a temperature difference of at least 800° C. When $Si_3N_4$ having a four-point flexural strength of less than 100 k-g/mm$^2$ measured in accordance with the Japanese Industrial Standard is employed, no wear occurs on the tip of the push rod and on the receiving surface on the side of the base metal in the same durability test as in Example 1 and the sliding is not hindered. However, even if the crowning proportion is within a preferred range, it is observed that minute cracks occur at the periphery of the ceramic where the crowning proportion is high. Thus, it is apparent that, as in the Examples described below, measures such as incorporating an intermediate layer in the junction part in advance and changing crowning proportions between the center and the periphery are required for utilizing the above type of ceramic in perfect condition in an atmosphere severer than in this durability test.

Example 3

Figure 13:
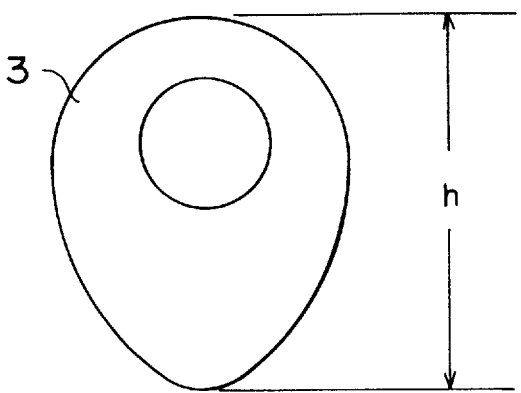
FIG. 13 is a view explaining a condition of abrasion of a cam.

Junction members having sliding face roughness and thickness values varied from each other were prepared from the same $Si_3N_4$ material as in Example 1. The thickness of the brazing layer was 17 μm. The junction members were joined to base metals mentioned in Example 2 at varied ratios of the minimum thickness on the center line of the base metal (indicated as 3 mm in FIG. 11) to the thickness of the sliding member of $Si_3N_4$. Thereafter, the quenching according to the Japanese Industrial Standard was conducted, thereby obtaining tappet components. The number of junctions was 20 under the identical conditions, and the crowning proportions thereof are listed as the range from the minimum to the maximum value in Table 4. With respect to each of the various tappet components, the wear of the push rod and the push rod receiving surface were evaluated with the use of the same engine as in Example 1 in the same manner as in Example 1. At that time, the condition of wear of the cam was evaluated in terms of the mass of wear of the cam nose height shown in FIG. 13. The mass of wear loss of 5 μm or greater is specified as "wear" and the mass of wear of less than 5 μm as "no wear" in Table 4.

TABLE 4

| No. | Crowning proportion (%) | Dispersion of crowning proportion (%) | Ratio of min. thickness of base metal | Sliding face surface roughness | Wear of push rod and receiving surfacing | Wear of cam nose |
|---|---|---|---|---|---|---|
| 1 | 0.152–0.156 | 0.004 | 1.0 | Rz = 1.2 μm | no wear | wear |
| 2 | 0.152–0.156 | 0.004 | 1.0 | 0.2 | no wear | no wear |
| *3 | 0.082–0.084 | 0.002 | 1.0 | 0.2 | wear | no wear |
| 4 | 0.118–0.129 | 0.011 | 0.4 | 0.2 | no wear | no wear |
| *5 | 0.066–0.076 | 0.010 | 0.4 | 0.2 | wear | no wear |
| *6 | 0.021-0.022 | 0.001 | 1.0 | 0.2 | slight wear | slight wear |
| 7 | 0.125–0.134 | 0.009 | 0.6 | 0.6 | no wear | slight wear |

*Comparative Example
**The sliding face surface roughness was evaluated in terms of ten-point mean roughness.

It is apparent from the above results that, when the crowning proportion is in the range of 0.1 to 0.4% but the ratio of base metal minimum thickness is less than 0.5 as in, for example, No. 4, the dispersion of the crowning proportion in the lot is extensive, so that the performance dispersion is likely to occur. Further, it is seen that, when the sliding face surface roughness exceeds 0.4 μm in terms of ten-point average height roughness as in Nos. 1 and 7, the wear of the cam nose is likely to occur. Further, it is seen that, when the crowning proportion is less than 0.10, not only the wear of the push rod and the receiving surface but also the wear of the cam nose caused by defective rotation of the tappet would unfavorably occur.

Example 4

Tappet components were produced from joined bodies using the same $Si_3N_4$ material as in Example 1 and the base metal mentioned in Example 2 and having varied sliding member thicknesses. The thickness of the brazing layer of each tappet component was 16 μm. With respect to each of the tappet components, the wear of the push rod, the push rod receiving surface and the cam were evaluated with the use of the same engine as in Example 1 in the same manner as in Example 3. The results are given in Table 5.

Moreover, the resistance of each ceramic part to fracturing was evaluated by the same impact test as in Example 2, and the results are also given in Table 5.

TABLE 5

| No. | Crowning proportion | Ratio of sliding face thickness | Wear of push rod and receiving surface | Wear of cam nose | Result of impact test |
|---|---|---|---|---|---|
| *1 | 0.02% | 0.20 | wear | wear | no fracture |
| *2 | 0.08 | 0.08 | wear | no wear | no fracture |
| 3 | 0.12 | 0.05 | no wear | no wear | no fracture |
| 4 | 0.18 | 0.03 | no wear | no wear | no fracture |
| 5 | 0.20 | 0.01 | no wear | no wear | no fracture |
| 6 | 0.20 | 0.005 | no wear | no wear | fractured |
| *7 | 0.50 | 0.005 | no wear | no wear | fractured |

*Comparative Example.

It is apparent from the above results that, when the ratio of sliding face thickness is in the range of 0.01 to 0.05, the push rod, the receiving surface and the cam nose would not be worn and a tappet component having excellent impact resistance can be obtained. It is also apparent that, when the ratio of sliding face thickness is greater than 0.01, the degree of deformation of the ceramic part is not satisfactory, so that the crowning proportion is small.

Example 5

Various $Si_3N_4$ junction members obtained in Example 2 were mirror finished so that the surface roughness became 0.1 μm or less in ten-point mean roughness, and the porosity observed in a visual field of 10 mm×10 mm of each surface was evaluated in terms of area ratio. The results are shown in Table 6. On the other hand, each junction material was joined in the same manner as in Example 2, thereby obtaining a tappet component. The thickness of the brazing layer was 17 μm. The same evaluation as in Example 3 was conducted. The results of evaluation of the wear of the push rod, the push rod receiving surface and the cam nose are given in Table 6.

TABLE 6

| No. | Crowning proportion | Percentage of pore area | Wear of push rod and receiving surface | Wear of cam nose |
|---|---|---|---|---|
| 1 | 0.10% | 1.5% | no wear | wear |
| *2 | 0.05 | 0.2 | wear | no wear |
| 3 | 0.20 | 0.5 | no wear | no wear |
| 4 | 0.20 | 1.0 | no wear | slight wear |
| 5 | 0.80 | 0.2 | **cracked | — |

*Comparative Example
**cracked: The ceramic periphery suffered from cracking.

It has become apparent from the above results that the cam nose suffers from a slight wear when the sliding face has a pore area ratio exceeding 0.5% but the cam nose is free of wear when the ratio is not higher than 0.5%.

Example 6

Figure 14:
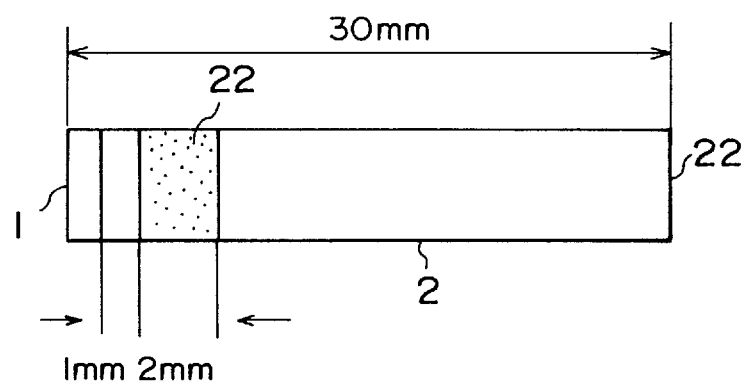
FIG. 14 is an explanatory view of a form of base metal employed in Example 6.
Figure 15:
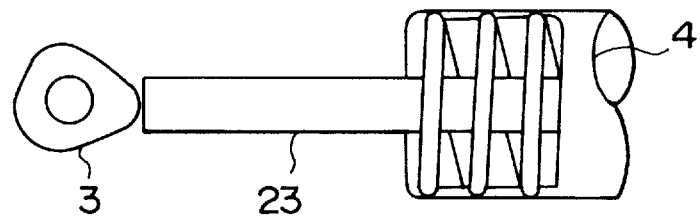
FIG. 15 is a view explaining the cam/piston mechanism of a commercially available light oil fuel pump.

A material of 10 mm in diameter and 1.5 mm in thickness was cut from a commercially available silicon nitride ceramic. One surface thereof was finish ground by lapping with the use of a diamond abrasive so that the surface roughness was 0.3 μm in terms of ten-point mean roughness. The thus obtained sliding face member of silicon nitride 1 was joined to a base metal 2 made of SCM 420 steel according to the Japanese Industrial Standard and having a shape shown in FIG. 14 with the use of a brazing material composed mainly of Ag in vacuum for 1 hr at 780° C. Thereafter, surface hardening was effected by high frequency in an area of 1–3 mm in length from the junction interface of the base metal and the face opposite to the sliding member junction. Thus, the sliding member of silicon nitride was provided with a crowning profile of 10 to 15 μm, and a push rod component 23 having its surface hardness regulated to 42 in terms of $H_{RC}$ was obtained. Separately, the hardening of the above 1–3 mm region of the base metal was avoided to thereby provide the sliding member of silicon nitride with a crowning profile of up to 5 μm (Comparative Example 1). Further, push rods of the metal per se provided with various surface treatments specified in Table 7 (Comparative Examples 2 to 4) and push rod of G2-class carbide alloy (Comparative Example 5) were provided. Each push rod was assembled into the cam 3/piston 4 system of a commercially available light oil fuel pump shown in FIG. 15, and a 1000 hr durability evaluation was made. The total mass of wear along the length of each component, i.e., the sum of the mass of wear of the tip of the push rod 23 and the receiving surface of the main body base metal was measured. The results are given in Table 7.

TABLE 7

| Particulars of specimen | Crowning proportion | Total mass of wear |
|---|---|---|
| Example | 10–15 μm | 2 μm |
| Comp. Ex. 1 | 5 μm or less | 15 μm |
| Comp. Ex. 2: SKD12, hardening according to JIS, hardness $H_{RC}$ of 55 | 10–15 μm | 30 μm |
|  | 5 μm or less | 40 μm |
| Comp. Ex. 3: SNCM439, hardening according to JIS, hardness $H_{RC}$ of 45 | 10–15 μm | 55 μm |
|  | 5 μm or less | 60 μm |
| Comp. Ex. 4: SKD51, hardening according to JIS, hardness $H_{RC}$ of 58 having its surface provided with hard Cr plating | 10–15 μm | 22 μm |
|  | 5 μm or less | 25 μm |
| Comp. Ex. 5 | 10–15 μm | 17 μm |
|  | 5 μm or less | 20 μm |

Example 7

Figure 16:
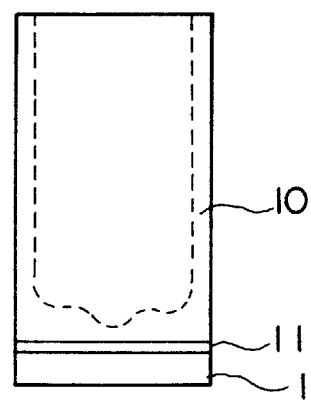
FIG. 16 is a view explaining a mode of application of the present invention to a tappet.

A sintered body of $Si_3N_4$ (28 mm in outer diameter and 2 mm in thickness), which using a sintering aid had a four-point flexural strength of 1350 MPa measured in accordance with the Japanese Industrial Standard and all surfaces of which were polished by means of No. 800 diamond wheel so as to have a ten-point mean roughness of 0.3 μm, was prepared as a ceramic with the use of a sintering aid composed mainly of $Y_2O_3$ and $Al_2O_3$. This sintered body of $Si_3N_4$ exhibited a heat resistance shock against to a temperature difference of 800° C. Referring to FIG. 16, the surface of the $Si_3N_4$ 1 was metallized by ion plating with Ti, Cu and Ag in this order. The thickness of each layer was 0.5 μm. This $Si_3N_4$ was brazed to a tappet body 10 made of SCr 420 steel by heating at 810° C. in high vacuum for 10 min with the use of a silver brazing material (Ag-Cu) 11 having a melting point of 780° C., thereby obtaining a joined body. The cooling after the brazing took 2 hr. The thickness of the junction layer consisting of the metallization layers and the silver brazing material was 17 μm. Surface hardening was conducted around the junction layer of the tappet body 10 by high frequency heating at 750° C. The hardness of that part was 50 in terms of $H_{RC}$. No crack was observed on the joined body after the surface hardening, and the extent of crowning of the sliding face, i.e., the maximum protrudent part height (h) of the crowning profile part was 75 μm (0.26% of maximum sliding face length l). With respect to the resultant tappet, the same durability test as in Example 1 was performed and the mass of wear of the cam nose was checked in the same manner as in Example 1. The total mass of wear was 2 μm.

Example 8

An $Si_3N_4$ having the same shape as in Example 7 whose four-point flexural strength was, however, 1500 MPa was prepared as a ceramic and joined, without metallization, to SNCM 630 steel by heating at each temperature specified in Table 8 in high vacuum for 10 min with the use of each brazing material specified in Table 10. The cooling was conducted by the forced Ar gas cooling method at a rate of 50° C./min until 300° C. and 20° C./min thereafter. The thickness of the brazing layer was 17 μm. The obtained specimen was inspected for the extent of crowning and the occurrence of cracking by the fluorescent penetrant inspection test, and the hardness of the metal part was measured.

The specimen No. 3 brazed at 980° C. with the use of a brazing material of Ag-Cu-Ti was free from cracking at the ceramic part but suffered from peeling at the junction face. With the exception of specimen No. 3, the durability test was conducted under the same conditions as in Example 1 and the mass of wear of the cam nose was checked. The results are also given in Table 8.

TABLE 8

| | Brazing material | Melting point (20 C.) | Brazing temp. (°C.) | Crack | Crowning extent (μm) | Proportion of crowning extent to diam. (%) | Hardness of metal part ($H_{RC}$) | Mass of wear (μm) |
|---|---|---|---|---|---|---|---|---|
| 1 | Ag—Cu—In—Ti | 690 | 730 | none | 25 | 0.089 | 45 | 12 |
| 2 | Ag—Cu—Ti | 780 | 820 | none | 37 | 0.132 | 48 | 5 |
| 3 | Ag—Cu—Ti | 780 | 980 | found | 4 | 0.014 | 50 | — |
| 4 | Ag—Ti | 950 | 980 | none | 59 | 0.211 | 50 | 2 |

Example 9

Figure 17:
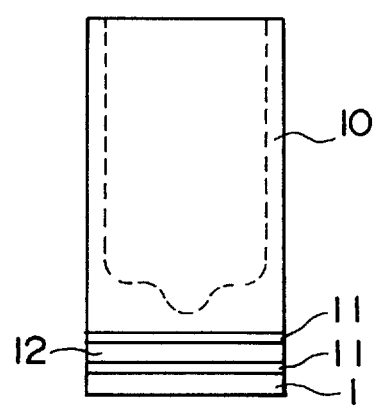
FIG. 17 is a view explaining a mode of application of the present invention to a tappet, in which use is made of an intermediate layer and a brazing material.

Each sintered body of $Si_3N_4$ of 25 mm in diameter having a strength and thickness specified in Table 9 was prepared as a ceramic with the use of a sintering aid composed mainly of $Y_2O_3$ and $Al_2O_3$. The junction face was polished by means of No. 800 diamond grinding wheel and the sliding face was mirror polished so as to have a ten-point mean roughness of 0.2 μm or less. Referring to FIG. 17, this $Si_3N_4$ 1 was joined to a tappet body 10 of the same diameter made of SKC 31 steel, with each intermediate layer 12 of Table 9 interposed therebetween, by heating at 820° C. in high vacuum with the use of a brazing material of Ag-Cu-Ti 11, thereby obtaining a joined body. The cooling was conducted at a rate 50° C./min until 200° C. and 10° C./min thereafter. In addition to the fluorescent penetrant examination and crowning extent inspection tests mentioned in Example 8, the impact test by the apparatus known as the same instrumented Charpy impact tester as that of Example 2 (FIG. 12) was conducted in which an iron hammer (head shape: R=2.5 mm, 17 mm in length) was dropped on the sliding part of the joined body and in which the then generated impact load was measured with a load cell secured to the hammer. The average hardness of the steel part was 48 in terms of $H_{RC}$. The same engine test as in Example 1 was conducted of the tappet of the present invention specified in the last column of Table 9. As a result, the mass of wear of the cam nose part opposite to the crowning part was as small as 5 μm or less, exhibiting high durability.

TABLE 9

| | $Si_3N_4$ | | Intermediate layer | | | |
|---|---|---|---|---|---|---|
| | strength (MPa) | thickness (mm) | material | coefficient of thermal expansion ($10^{-6}$ $K^{-1}$) | Young's modulus ($\times 10^5$ MPa) | thickness (mm) |
| 1 | 1350 | 1.2 | Mo | 5.5 | 3.3 | 1 |
| 2 | 1350 | 1.2 | W | 4.5 | 4 | 1 |
| 3 | 1350 | 1.2 | W—Cu alloy | 6.5 | 3.2 | 1 |
| 4 | 1350 | 1.2 | WC—Co | 4.5 | 6 | 1 |
| 5 | 1350 | 1.2 | TiC—Co | 7.5 | 4.6 | 1 |
| 6 | 1350 | 1.2 | Cu | 17 | 1.3 | 1 |
| 7 | 1350 | 1.2 | Ni | 13 | 2.1 | 1 |
| 8 | 1350 | 1.3 | none | — | — | — |
| 9 | 1000 | 1.2 | WC—Co | 4.5 | 6 | 1 |
| 10 | 1000 | 1.2 | Mo | 5.5 | 3.3 | 1 |
| 11 | 1350 | 1.2 | W | 4.5 | 4 | 1 |
| 12 | 1000 | 1.3 | none | — | — | — |
| 13 | 1500 | 1.2 | WC—Co | 4.5 | 6 | 1 |
| 14 | 1500 | 1.2 | MO | 5.5 | 3.3 | 1 |
| 15 | 1500 | 1.2 | W | 4.5 | 4 | 1 |

| | Test Result | | | |
|---|---|---|---|---|
| | Crack | Crowning extent (μm) | Proportion of crowning extent to diam. (%) | Impact value (kJ/$m^2$) | Invention |
| 1 | none | 34 | 0.136 | 16 | ○ |
| 2 | none | 38 | 0.152 | 17 | ○ |
| 3 | none | 34 | 0.136 | 16 | ○ |
| 4 | none | 42 | 0.168 | 18 | ○ |
| 5 | none | 34 | 0.136 | 17 | ○ |
| 6 | none | 15 | 0.060 | 10 | |
| 7 | none | 20 | 0.080 | 10 | |
| 8 | none | 40 | 0.160 | 16 | ○ |
| 9 | none | 41 | 0.164 | 16 | ○ |

TABLE 9-continued

| | | | | | |
|---|---|---|---|---|---|
| 10 | none | 36 | 0.144 | 10 | ○ |
| 11 | none | 37 | 0.148 | 15 | ○ |
| 12 | found | 5 | 0.020 | — | |
| 13 | none | 42 | 0.168 | 19 | ○ |
| 14 | none | 38 | 0.152 | 17 | ○ |
| 15 | none | 37 | 0.148 | 17 | ○ |

Example 10

The same tests as in Example 9 were carried out except that the brazing was conducted at 980° C. with a brazing material of Ag-Ti. Thus, the results of Table 10 were obtained. The average hardness of the steel part was 50 in terms of $H_{RC}$. The surface roughness of the sliding face member was 0.2 μm in terms of ten-point average height roughness. The same engine test as in Example 1 was conducted on the tappet of the present invention specified in the last column of Table 10. As a result, the mass of wear of the cam nose part opposite to the crowning part was as small as 5 μm or less, exhibiting high durability.

TABLE 10

| | $Si_3N_4$ | | Intermediate layer | | | |
|---|---|---|---|---|---|---|
| | strength (MPa) | thickness (mm) | material | coefficient of thermal expansion ($10^{-6}$ K$^{-1}$) | Young's modulus ($\times 10^5$ MPa) | thickness (mm) |
| 1 | 1350 | 1.2 | Mo | 5.5 | 3.3 | 1 |
| 2 | 1350 | 1.2 | W | 4.5 | 4 | 1 |
| 3 | 1350 | 1.2 | W—Cu alloy | 6.5 | 3.2 | 1 |
| 4 | 1350 | 1.2 | WC—Co | 4.5 | 6 | 1 |
| 5 | 1350 | 1.2 | TiC—Co | 7.5 | 4.6 | 1 |
| 6 | 1350 | 1.2 | Cu | 17 | 1.3 | 1 |
| 7 | 1350 | 1.2 | Ni | 13 | 2.1 | 1 |
| 8 | 1350 | 1.3 | none | — | — | — |
| 9 | 1000 | 1.2 | WC—Co | 4.5 | 6 | 1 |
| 10 | 1000 | 1.2 | Mo | 5.5 | 3.3 | 1 |
| 11 | 1000 | 1.2 | W | 4.5 | 4 | 1 |
| 12 | 1000 | 1.3 | none | — | — | — |
| 13 | 1500 | 1.2 | WC—Co | 4.5 | 6 | 1 |
| 14 | 1500 | 1.2 | Mo | 5.5 | 3.3 | 1 |
| 15 | 1500 | 1.2 | W | 4.5 | 4 | 1 |

| | | Test Result | | | |
|---|---|---|---|---|---|
| | Crack | Crowning extent (μm) | Proportion of crowning extent to diam. (%) | Impact value (kJ/m²) | Invention |
| 1 | none | 50 | 0.200 | 16 | ○ |
| 2 | none | 55 | 0.220 | 17 | ○ |
| 3 | none | 47 | 0.188 | 17 | ○ |
| 4 | none | 59 | 0.236 | 18 | ○ |
| 5 | none | 48 | 0.192 | 17 | ○ |
| 6 | none | 16 | 0.064 | 10 | |
| 7 | none | 22 | 0.088 | 10 | |
| 8 | none | 56 | 0.224 | 17 | ○ |
| 9 | none | 58 | 0.232 | 17 | ○ |
| 10 | found | 30 | 0.120 | — | |
| 11 | none | 49 | 0.196 | 17 | ○ |
| 12 | found | 5 | 0.020 | — | |
| 13 | none | 59 | 0.236 | 19 | ○ |
| 14 | none | 54 | 0.216 | 18 | ○ |
| 15 | none | 52 | 0.208 | 18 | ○ |

Example 11

Joined bodies were each obtained by performing the joining at 820° C. in Ar atmosphere for 15 min with the use of a ceramic sliding face member and an intermediate layer of 12 mm in diameter specified in Table 11 which had one surface polished so as to have a surface roughness of 0.2 μm in terms of ten-point mean roughness and further with the use of SCr 420 steel of the same diameter having a thickness of 5 mm and also a brazing material of Ag-Cu-Ti. The cooling rate was 10° C./min. The results are given in the table. The circle mark of the rightmost column of the table indicates an embodiment of the present invention.

As apparent from the results, the interposition of an intermediate layer having high Young's modulus and yield stress and having a coefficient of thermal expansion close to that of the sliding face member brought into contact therewith enabled obtaining a joined body of extensive crowning. However, the respective strengths of $Al_2O_3$ and SiC included in the table are low as compared with those of $Si_3N_4$ and WC-Co, so that the range of selection of an intermediate layer is narrow and that the upper limit of formable crowning extent is also low. The same durability test as in Example 1 was conducted. The mass of wear of the opposite cam nose ranged from 6 to 8 μm and not only the tappet per se but also the junction part thereof had no abnormal wear damage.

TABLE 11

| | Slide face member | | | Intermediate layer | | |
|---|---|---|---|---|---|---|
| | Material | 4-point strength (MPa) | thickness (mm) | material | coefficient of thermal expansion ($10^{-6}$ K$^{-1}$) | Young's modulus ($\times 10^5$ MPa) | thickness (mm) |
| 1 | $Al_2O_3$ | 500 | 1 | Mo | 5.5 | 3.3 | 0.5 |
| 2 | $Al_2O_3$ | 500 | 1 | W | 4.5 | 4 | 0.5 |
| 3 | $Al_2O_3$ | 500 | 1 | W—Cu alloy | 6.5 | 3.2 | 0.5 |
| 4 | $Al_2O_3$ | 500 | 1 | WC—Co | 4.5 | 6 | 0.5 |
| 5 | $Al_2O_3$ | 500 | 1 | TiC—Co | 7.5 | 4.6 | 0.5 |

TABLE 11-continued

| | | | | | | | |
|---|---|---|---|---|---|---|---|
| 6 | Al$_2$O$_3$ | 500 | 1 | Cu | 17 | 1.3 | 0.5 |
| 7 | Al$_2$O$_3$ | 500 | 1 | Ni | 13 | 2.1 | 0.5 |
| 8 | Al$_2$O$_3$ | 500 | 1 | none | — | — | — |
| 9 | SiC | 700 | 1 | WC—Co | 4.5 | 6 | 1 |
| 10 | SiC | 700 | 1 | Mo | 5.5 | 3.3 | 1 |
| 11 | SiC | 700 | 1 | W | 4.5 | 4 | 1 |
| 12 | SiC | 700 | 1 | none | — | — | — |
| 13 | WC—Co | 1800 | 1 | W | 4.5 | 4 | 1 |
| 14 | WC—Co | 1800 | 1 | none | — | — | — |

| | Test Result | | | |
|---|---|---|---|---|
| | Crack | Crowning extent (μm) | Proportion of crowning extent to diam. (%) | Invention |
| 1 | none | 18 | 0.150 | ○ |
| 2 | none | 19 | 0.158 | ○ |
| 3 | none | 16 | 0.133 | ○ |
| 4 | none | 18 | 0.150 | ○ |
| 5 | none | 19 | 0.158 | ○ |
| 6 | none | 5 | 0.042 | |
| 7 | found | 2 | 0.017 | |
| 8 | found | 3 | 0.025 | |
| 9 | none | 28 | 0.233 | ○ |
| 10 | none | 25 | 0.208 | ○ |
| 11 | none | 27 | 0.225 | ○ |
| 12 | found | 5 | 0.042 | |
| 13 | none | 29 | 0.242 | ○ |
| 14 | none | 18 | 0.150 | ○ |

Example 12

Figure 18:
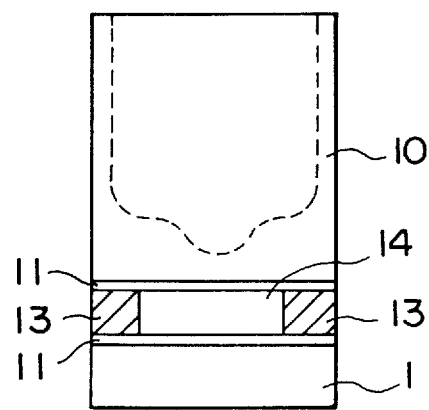
FIG. 18 is a view explaining a mode of application of the present invention to a tappet, in which the material of the intermediate layer is different between the center and the periphery thereof.

Referring to FIG. 18, each of Si$_3$N$_4$ materials of 30 mm in diameter and 2.5 mm in thickness having a four-point flexural strength ranging from 1350 to 800 MPa as a ceramic was joined to a tappet body 10 of the same diameter made of SKD 11 as a metal via an intermediate layer. With respect to the intermediate layer, a ring-shaped material of 30 mm in outer diameter, 22 mm in inner diameter and 1.2 mm in thickness was prepared as a peripheral intermediate layer and a material of 22 mm in diameter and 1.2 mm in thickness as a central intermediate layer 14. The above materials were assembled as in FIG. 18 and joined with the use of the same brazing material and under the same conditions as in Example 1, thereby obtaining a joined body. In the outer intermediate layer, the yield strengths at room temperature of employed Ni and Cu were 180 MPa and 90 MPa, respectively, while those of the other employed materials of the table were at least 300 MPa.

Besides the occurrence of cracking, the extent of crowning and curvature ratio (ratio of the curvature of diametrically 4 mm ranged peripheral part to that of diametrically 15 mm ranged central part) were measured of each joined body specimen. The results are given in Table 12. It is apparent from the results that the intermediate layer having a peripheral part whose Young's modulus and yield stress are lower than those of the central part facilitates obtaining an extensive crowning. When the ratio of curvature exceeded 0.8 as in specimen No. 9 according to the present invention, cracking occurred in the vicinity of the junction boundary of the ceramic part. The same durability test as in Example 1 was conducted of each of the above specimen tappets according to the present invention. The mass of wear of the opposite cam nose ranged from 4 to 6 μm and not only the tappet per se but also the junction part thereof had no abnormal wear damage. The above regulation of the crowning profile so as to render the curvature of the periphery lower enabled obtaining an extensive crowning without cracking even if a ceramic of relatively low strength was used.

TABLE 12

| | | Outer Intermediate layer | | | Inner Intermediate layer | | |
|---|---|---|---|---|---|---|---|
| | Si$_3$N$_4$ strength (MPa) | material | coefficient of thermal expansion (10$^{-6}$ K$^{-1}$) | Young's modulus (×10$^5$ MPa) | material | coefficient of thermal expansion (10$^{-6}$ K$^{-1}$) | Young's modulus (×10$^5$ MPa) |
| 1 | 1000 | WC—Co | 4.5 | 6 | WC—Co | 4.5 | 6 |
| 2 | 800 | W | 4.5 | 4 | Mo | 5.5 | 3.3 |
| 3 | 800 | W | 4.5 | 4 | W—Cu alloy | 6.5 | 3.2 |
| 4 | 800 | Ni | 13 | 2.1 | W—Cu alloy | 6.5 | 3.2 |
| 5 | 800 | W—Cu alloy | 6.5 | 3.2 | W—Cu alloy | 6.5 | 3.2 |
| 6 | 800 | Ni | 13 | 2.1 | WC—Co | 4.5 | 6 |
| 7 | 800 | Cu | 17 | 1.3 | WC—Co | 4.5 | 6 |
| 8 | 800 | WC—Co | 4.5 | 6 | WC—Co | 4.5 | 6 |
| 9 | 800 | WC—Co | 4.5 | 6 | WC—Co | 4.5 | 6 |

TABLE 12-continued

| | | Test Result | | | |
|---|---|---|---|---|---|
| | Crack | Crowning extent ($\mu$m) | Proportion of crowning extent to diam. (%) | Ratio of curvature | Invention |
| 1 | none | 80 | 0.266 | 0.8 | ○ |
| 2 | found | 5 | 0.017 | — | |
| 3 | found | 6 | 0.020 | — | |
| 4 | none | 60 | 0.200 | 0.6 | ○ |
| 5 | found | 7 | 0.023 | — | |
| 6 | none | 65 | 0.217 | 0.55 | ○ |
| 7 | none | 53 | 0.177 | 0.35 | ○ |
| 8 | found | 6 | 0.020 | — | |
| 9 | found | 90 | 0.300 | 1.0 | ○ |

Example 13

Figure 19:
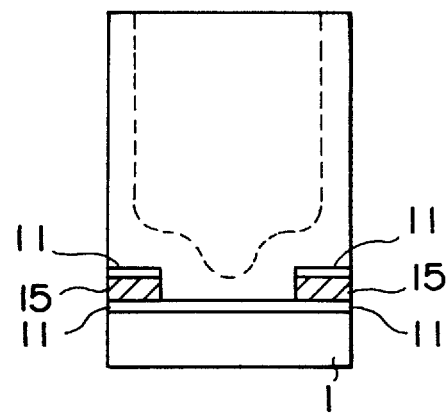
FIG. 19 is a view explaining a mode of application of the present invention to a tappet, in which the intermediate layer is disposed only at the periphery.

The same joining and tests as in Example 12 were performed except that, without the use of the inner intermediate layer, the structure as shown in FIG. 19 was adopted in which, at the center, only the same brazing material 11 as in Example 12 was interposed between the ceramic 1 and the metal tappet body 2 to effect the joining and that only peripheral intermediate layer 15 specified in Table 13 was employed. The results are also given in the table. The coefficient of thermal expansion, Young's modulus and yield stress of the metal part were $13\times10^{-6} \text{K}^{-1}$, $2.0\times10^5$ MPa and 300 MPa, respectively. It is apparent from the results that, even if the intermediate layer is employed only at the periphery, the stress relaxation effect is marked and a joined body of extensive crowning can be obtained.

Example 14

Figure 20:
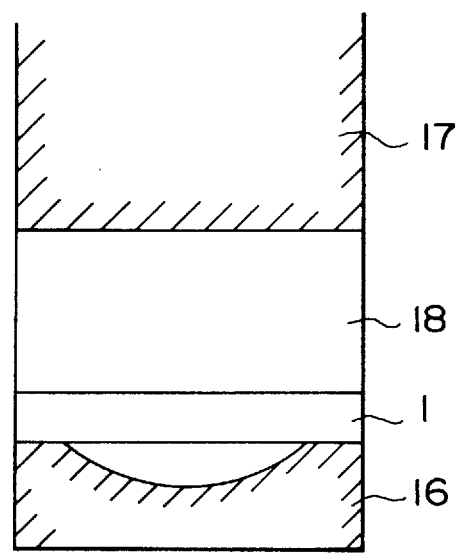
FIG. 20 is a view explaining a mode of use of a carbon-made mold and a pestle.

A carbon-made mold 16, a carbon-made pestle 17, a sintered $Si_3N_4$ (16 mm in diameter and 2 mm in thickness) 1 having a flexural strength of 1350 MPa and a raw material powder of iron-based sintered alloy 18 (weighed so as to have a thickness of 6 mm after densification) were set as shown in FIG. 20 and held at 1000° C. in vacuum under a load of 30 MPa for 5 min. The metal part was sintered to a satisfactory degree and a desirable joined body free of cracking at the ceramic part was obtained. The extent of crowning was 30 $\mu$m which corresponded to 0.19% of the diameter.

Example 15

A silver brazing material having a melting point of 780° C was incorporated in the interstices of a sintered $Si_3N_4$ of

TABLE 13

| | | Outer Intermediate layer | | | Inner Intermediate layer | | |
|---|---|---|---|---|---|---|---|
| | $Si_3N_4$ strength (MPa) | material | coefficient of thermal expansion ($10^{-6}$ K$^{-1}$) | Young's modulus ($\times10^5$ MPa) | material | coefficient of thermal expansion ($10^{-6}$ K$^{-1}$) | Young's modulus ($\times10^5$ MPa) |
| 1 | 1350 | W | 4.5 | 4 | none | — | — |
| 2 | 1350 | Mo | 5.5 | 3.3 | none | — | — |
| 3 | 1350 | W—Cu alloy | 6.5 | 3.2 | none | — | — |
| 4 | 1350 | Ni | 13 | 2.1 | none | — | — |
| 5 | 1350 | Cu | 17 | 1.3 | none | — | — |
| 6 | 1350 | WC—Co | 4.5 | 6 | none | — | — |
| 7 | 1000 | W | 4.5 | 4 | none | — | — |
| 8 | 1000 | Mo | 5.5 | 3.3 | none | — | — |
| 9 | 1000 | Ni | 13 | 2.1 | none | — | — |
| 10 | 1000 | Cu | 17 | 1.3 | none | — | — |
| 11 | 1000 | WC—Co | 4.5 | 6 | none | — | — |

| | | Test Result | | | |
|---|---|---|---|---|---|
| | Crack | Crowning extent ($\mu$m) | Proportion of crowning extent to diam. (%) | Ratio of curvature | Invention |
| 1 | none | 85 | 0.283 | 0.65 | ○ |
| 2 | none | 88 | 0.293 | 0.7 | ○ |
| 3 | none | 90 | 0.300 | 0.65 | ○ |
| 4 | none | 75 | 0.250 | 0.5 | ○ |
| 5 | none | 70 | 0.233 | 0.3 | ○ |
| 6 | none | 85 | 0.283 | 0.6 | ○ |
| 7 | none | 83 | 0.277 | 0.65 | ○ |
| 8 | none | 85 | 0.283 | 0.75 | ○ |
| 9 | none | 77 | 0.257 | 0.55 | ○ |
| 10 | none | 72 | 0.240 | 0.25 | ○ |
| 11 | none | 83 | 0.277 | 0.55 | ○ |

20 mm in diameter and 1.0 mm in thickness having a strength of 1350 MPa which had been metallized in the same manner as in Example 7, a carbide alloy plate of the same diameter and 1 mm in thickness destined for an intermediate layer and a chromium/molybdenum steel of the same diameter and 10 mm in thickness and set in a carbon mold.

Figure 21:
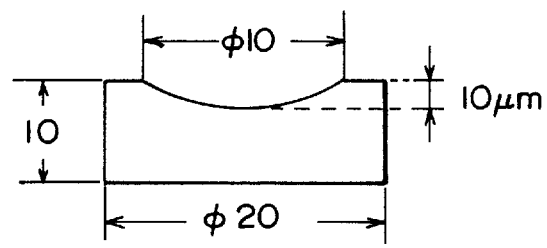
FIG. 21 is an explanatory view of an example of mold dimension.

The $Si_3N_4$ plate was set so as to contact a carbon mold being 10 μm low at its center and flat at the 3 mm peripheral part thereof as shown in FIG. 21. The materials were heated at 810° C. in vacuum without any load, allowed to stand still for 3 min and held under a load of 400 MPa for 1 min, thereby obtaining a cylindrical joined body. The joined body was free of defects such as crack, and the extent of crowning and the ratio of the curvature of the periphery (part A of the same figure: 3 mm range from the outer boundary) to that of the center (part B of the same figure: central diametrically 8 mm ranged part) were 55 μm and 0.75, respectively. Similar joining was performed with the use of a carbon mold being flat on its entire surface. The extent of crowning and the ratio of curvature thereof were 48 μm and 0.9, respectively.

Thus, the effect of changing the shape of the mold was recognized.

Example 16

Figure 22:
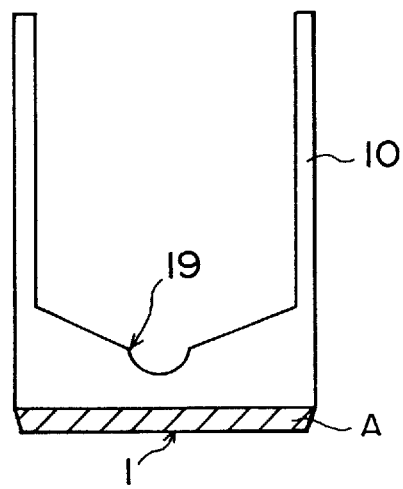
FIG. 22 is an explanatory view of a tappet to which the present invention has been applied.
Figure 23:
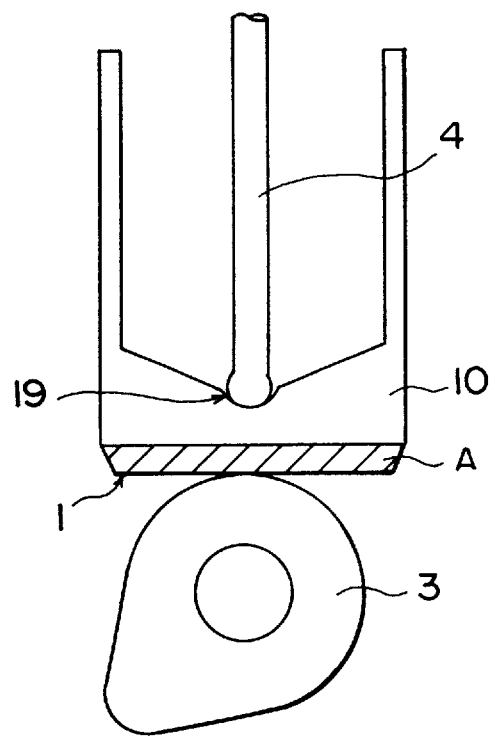
FIG. 23 is a view explaining a condition of use of a tappet.

FIG. 22 shows a tappet fabricated as an example of the sliding component according to the present invention. This tappet encounters especially severe sliding conditions at the sliding face 1 as seen from the state of being actually used as shown in FIG. 23. The sliding member of $Si_3N_4$ A is joined by brazing or cemented carbide diffusion joining (1050° C.) in order to form the sliding face 1 according to the present invention. In FIG. 23, numeral 3 denotes a cam and numeral 4 a push rod component. The $Si_3N_4$-made sliding face member A was prepared in the following procedure. 5% by weight of $Y_2O_3$ and 2% by weight of $Al_2O_3$ as sintering aids were added to commercially available powdery $Si_3N_4$ and mixed in ethanol by means of a ball mill for 48 hr. The mixture was dried, and the resultant mixture powder was pressed and CIP treated. Thereafter, sintering was conducted at 1700° C. for 4 hr in 2 atm of nitrogen gas atmosphere, and the sintered body was HIP treated at 1650° C. for 1 hr in 1000 atm of nitrogen gas atmosphere.

A specimen of 30 mm in diameter and 1 mm in thickness was cut from the resultant sintered body, and a flat part destined for a sliding face was formed at a flatness of 10 μm and a surface roughness of at most 0.3 μm (ten-point mean roughness). The mechanical properties of the obtained sintered body are specified in Table 14.

TABLE 14

|  | Mechanical properties |
| --- | --- |
| Flexural strength | 142 (kg/mm$^2$) |
| Charpy impact value | 15.5 (kJ/m$^2$) |
| Heat shock resistance | 870° C. | obtained from nickel/chromium/molybdenum steel SNCM 616 (Japanese Industrial Standard G4103) was gas carburized at 920° C. for 120 min and the surface thereof to be brazed and the periphery were polished.

The sliding member A was brazed to the tappet body 10 with the use of 50 μm-thick Ag-Cu-Ti brazing material by heating at 900° C. in vacuum for 30 min.

The brazed tappet was quenched by heating at varied temperature followed by air cooling. No cracking was observed on the sliding member of silicon nitride A after the quenching irrespective of the heating temperature. The crowning proportion of the tappet was about 0.2%.

Comparative tappets were fabricated by avoiding the carburization and by forming the whole body of the tappet from chilled cast iron. Each of the thus fabricated various tappets was assembled into a commercially available OHV system diesel engine for a commercial car and a durability test was performed at an engine speed of 1000 rpm for 200 hr with the use of deteriorated oil. The wear loss was measured of the sliding face 19 of the base metal.

The results are given in Table 15. The abrasion was evaluated as "no wear" when the mass of wear was less than 10 μm and "wear" when the mass of wear was 10 μm or more. The hardness of the tappet body (base metal) 10 is also specified in the table, which was evaluated by the C scale of Rockwell hardness.

TABLE 15

| No. | Material of sliding member A | Carburization | Quenching temperature (°C.) | $H_{RC}$ | Wear |
| --- | --- | --- | --- | --- | --- |
| 1 | $Si_3N_4$ | done | 850 | 52 | no wear |
| 2 | cemented carbide | done | 900 | 56 | no wear |
| 3 | $Si_3N_4$ | done | 750 | 40 | slight wear |
| 4 | $Si_3N_4$ | done | 700 | 35 | slight wear |
| 5 | $Si_3N_4$ | not done | 850 | 42 | slight wear |
| *6 | chilled cast iron | — | — | 39 | considerable wear |

[Note] In the table, the asterisked specimen is comparative. Specimen Nos. 3 to 5 suffered from slight wear because of low hardness, which wear was, however, less than that of the chilled cast iron. The hardness of the steel body must be at least 45 in terms of $H_{RC}$.

Example 17

Each of the silicon nitride obtained in Example 16 and various commercially available ceramics was worked into the same form as in Example 16 and brazed to the tappet body 10 of chromium steel SCr 420 (Japanese Industrial Standard G4104). The joined body was quenched. The hardness of the tappet body 10 was 49 in terms of $H_{RC}$. The tappet body was carburized, polished and brazed in the same manner as in Example 16, and the quenching was conducted by heating at 850° C. followed by oil cooling. The crowning extent was 0.20. The same durability test as in Example 16 was conducted of each fabricated tappet. The condition after the test of each of the various ceramic-made sliding members A is specified in Table 16, together with the condition after quenching thereof.

TABLE 16

| | | | | Heat | Crack of ceramic sliding member A | |
| | | | Charpy | shock | | |
| No. | Material | Flexural strength (kg/mm$^2$) | impact value (kJ/m$^2$) | resistance (°C.) | after quenching | after durability test |
| --- | --- | --- | --- | --- | --- | --- |
| 7 | $Si_3N_4$ | 141 | 15.3 | 840 | none | none |
| 8 | $Si_3N_4$ | 153 | 16.0 | 870 | none | none |
| 9 | commercial alumina | 50 | 1.5 | 200 | cracked | — |
| 10 | commercial SiC | 60 | 2.0 | 500 | cracked | — |
| 11 | commercial $Si_3N_4$ | 82 | 5.7 | 720 | cracked | — |

Of the commercially available ceramic Nos. 9 to 11, $Si_3N_4$ exhibits the most desirable performance. In this example, there was no thermal stress relaxation effect of the intermediate layer and the joining and quenching temperatures were high, so that minute cracks occurred at the interfacial ceramic part of the joined part.

The above ceramics were further tested in the presence of an intermediate layer. In this instance, the ceramic cracking did not occur irrespective of the same proportion of crowning and no abnormality occurred in the durability test.

Example 18

A disk of $Si_3N_4$ having a diameter of 25 mm and a thickness of 1.1 mm which was produced under the same conditions as in the production of the above $Si_3N_4$ material having a flexural strength of 90 kg/mm² as measured in the form of a flexural test piece according to the Japanese Industrial Standard was brazed to a tappet base metal of SCr 420 steel employed in Example 1 and having a spacing 1 mm smaller than the spacing of the tappet base metal of Example 1 between the junction face and the push rod receiving part, using a Ti-Cu-Ag brazing material by heating at 840° C. in high vacuum for 20 min to thereby effect the joining of the materials. In the brazing, the thickness of the interposed brazing material was varied within the range of 50 to 100 μm and the weight posed on the $Si_3N_4$ was varied within the range of 50 to 500 g, thereby obtaining specimens which had brazing material thickness values ranging from 7 to 55 μm after the joining. As apparent from Table 16, the specimens had no cracking attributed to thermal stress except that the specimen whose brazing material thickness was as extremely small as 7 μm suffered from such cracking. In the examination of defect of the junction face according to the ultrasonic inspection method, the defect percentage was 3% or below without exception, thereby attesting no formation of good junction. Smooth crowning profile was formed.

The same quenching according to the Japanese Industrial Standard as in Example 1 was carried out for increasing the hardness of the base metal part, whose face 5 joined to the push rod part had a hardness of 51 in terms of $H_{RC}$. Failure inspection attested to the occurrence of cracking on $Si_3N_4$ wherein the thickness of the brazing material was less than 15 μm as shown in FIG. 17 (the reason was considered to be that the distance between the junction face and the push rod was small in the present base metal and further, when the brazing material was thin, the buffering effect by its plastic deformation was slight, so that the strain of the steel part was directly conveyed to the $Si_3N_4$).

With respect to the crackless specimen, a further test was conducted in which a steel ball of 15 mm in diameter was dropped from a height of 1 m onto the surface of $Si_3N_4$ and whether or not the $Si_3N_4$ was damaged was inspected. As shown in Table 17, failure occurred when the thickness of the brazing material exceeded 25 μm, and the failure ratio increased in accordance with the increase of the thickness of the brazing material. The damaged specimen was sliced, and its section was observed. The plastic deformation of the brazing material was recognized by the observation.

TABLE 17

| Specimen No. | Thickness of brazing material (μm) | Occurrence of failure after joining | after quenching | after drop test |
|---|---|---|---|---|
| 1 | 7 | x | — | — |
| 2 | 10 | o | x | — |
| 3 | 12 | o | o | o |
| 4 | 13 | o | x | — |
| 5 | 15 | o | o | o |
| 6 | 18 | o | o | o |
| 7 | 20 | o | o | o |
| 8 | 23 | o | o | o |
| 9 | 25 | o | o | o |
| 10 | 27 | o | o | x |
| 11 | 28 | o | o | o |
| 12 | 30 | o | o | o |
| 13 | 35 | o | o | x |
| 15 | 37 | o | o | o |
| 16 | 45 | o | o | x |
| 17 | 55 | o | o | x |

(o: no failure, x: failure occurred, —: not tested.)

INDUSTRIAL APPLICABILITY

As apparent from the foregoing, the present invention can provide sliding members required to have resistance to wear such as valve train parts, a cam follower or a rocker arm and a bearing of an automobile engine, in particular, sliding members exhibiting high durability each comprising a base metal and, joined thereto, a ceramic sliding member.

We claim:

1. A silicon-nitride ceramic sliding component comprising a sliding face member joined to a base metal having a coefficient of thermal expansion greater than that of the sliding face member, the sliding face of the sliding face member having a crowning profile whose maximum height is 0.1 to 0.4% of the maximum sliding face length and wherein the silicon nitride material has a four-point flexural strength of at least 100 kg/mm² as measured in accordance with JTS R 1601-1981 of the Japanese Industrial Standards, a Charpy impact value of at least 15 kJ/m², a heat shock resistance to a temperature difference of at least 800° C. and an area ratio of pores opening at the sliding face of 0.5% or less relative to the area of the sliding face and the sliding face member has a thickness ratio ranging from 0.01 to 0.05 relative to the maximum length of the joined face corresponding to the sliding face.

2. The sliding component according to claim 1, wherein the ratio of the minimum thickness on the center line perpendicular to the joined face of the base metal to the thickness of the sliding face member is at least 0.5.

3. The sliding component according to claim 1, wherein the sliding face has a surface roughness of 0.4 μm or less in terms of ten-point mean roughness.

4. The sliding component according to claim 1, wherein the crowning profile of the sliding face has at the peripheral part thereof, a curvature of 0.8-fold or less of the curvature in the vicinity of the center thereof.

5. The sliding component according to claim 1, wherein the base metal is steel, at least the surface of which has a martensite texture, and has a hardness of at least 45 in terms of $H_{RC}$.

6. The sliding component according to claim 1, wherein an intermediate layer is interposed between the ceramic and the base metal.

7. The sliding component according to claim 6, wherein a metal or cermet having a Young's modulus greater than that of the ceramic is used in the intermediate layer.

8. The sliding component according to claim 6, wherein the intermediate layer is composed of a material having a Young's modulus of at least 4.5×10⁵ MPa.

9. The sliding component according to claim 6, wherein the coefficient of thermal expansion of the intermediate layer is closer at peripheral parts to that of the ceramic than at the center.

10. The sliding component according to claim 6, wherein the Young's modulus of the intermediate layer is lower at peripheral parts than at the center.

11. The sliding component according to claim 6, wherein the yield stress of the intermediate layer is lower at peripheral parts than at the center.

12. The sliding component according to claim 4, wherein an intermediate layer is provided only at the peripheral parts of the joined face of the ceramic and the base metal and the junction at other parts is effected without the use of the intermediate layer.

13. The sliding component according to claim 12, wherein the intermediate layer has a coefficient of thermal expansion which is intermediate between the base metal and the ceramic or capability of plastic deformation .

14. The sliding component according to claim 12, wherein the intermediate layer has a Young's modulus lower than that of the base metal.

15. The sliding component according to claim 1, wherein the ceramic is joined to the base metal by brazing.

16. The sliding component according to claim 15, wherein the brazing material has a melting point of at least 700° C.

17. The sliding component according to claim 15, wherein the brazing material has a melting point of at least 850° C.

18. The sliding component according to claim 17, wherein the brazing material does not contain copper.

19. The sliding component according to claim 18, wherein the brazing material is an Ag-Ti alloy.

20. A process for producing a silicon-nitride sliding component comprising a sliding face member joined to a base metal having a coefficient of thermal expansion greater than that of the sliding face member, the sliding face of the sliding face member having a crowning profile whose maximum height is 0.1 to 0.4% of the maximum sliding face length, which process comprises a step (I) of providing the base metal and the sliding face member for forming the sliding face, a step (II) of working both the base metal and the sliding face member so as to form mating faces adapted to form a joining face for the purpose of fixing the sliding face member to at least one portion of the base metal and a step (III) of disposing the two mating faces opposite to each other and heating to thereby fix the sliding face member on the base metal.

21. The process for producing a sliding component according to claim 20, wherein the base metal part and the crowning profile of the sliding face member are simultaneously formed in the step (III).

22. The process for producing a sliding component according to claim 20, wherein the sliding face having the crowning profile is pushed against a mold of specific profile to thereby regulate the profile in the step (III).

23. The process for producing a sliding component according to claim 20, wherein the base metal is steel and which comprises a step of carburizing the base metal between the steps (II) and (III) and further comprises a step (IV) of quenching the sliding face of the base metal after the step (III).

24. The process for producing a sliding component according to claim 23, wherein the quenching of the step (IV) is conducted at a temperature which is not higher than that at which the heating for fixing of the step (III) is carried out.

* * * * *